US011082465B1

(12) United States Patent
Chavez et al.

(10) Patent No.: US 11,082,465 B1
(45) Date of Patent: Aug. 3, 2021

(54) INTELLIGENT DETECTION AND AUTOMATIC CORRECTION OF ERRONEOUS AUDIO SETTINGS IN A VIDEO CONFERENCE

(71) Applicant: Avaya Management L.P., Santa Clara, CA (US)

(72) Inventors: David Chavez, Broomfield, CO (US); Pushkar Yashavant Deole, Pune (IN); Sandesh Chopdekar, Pune (IN); Navin Daga, Silapathar (IN)

(73) Assignee: Avaya Management L.P., Santa Clara, CA (US)

( * ) Notice: Subject to any disclaimer, the term of this patent is extended or adjusted under 35 U.S.C. 154(b) by 0 days.

(21) Appl. No.: 16/998,979

(22) Filed: Aug. 20, 2020

(51) Int. Cl.
*H04N 7/15* (2006.01)
*H04L 29/06* (2006.01)
*G06F 3/16* (2006.01)
*G06K 9/00* (2006.01)

(52) U.S. Cl.
CPC .......... *H04L 65/4038* (2013.01); *G06F 3/165* (2013.01); *G06K 9/00315* (2013.01); *H04N 7/152* (2013.01)

(58) Field of Classification Search
CPC . H04L 29/06; H04N 7/15; H04N 7/14; G06K 9/00; G06F 3/16

USPC ............................................ 348/14.01–14.16
See application file for complete search history.

(56) References Cited

U.S. PATENT DOCUMENTS

| 9,247,204 B1* | 1/2016 | Yin .......................... H04N 7/15 |
| 10,412,228 B1* | 9/2019 | Haus ................... H04L 65/4038 |
| 2014/0379351 A1* | 12/2014 | Raniwala ........... G06K 9/00335 704/270 |
| 2015/0156598 A1* | 6/2015 | Sun .......................... H04N 7/15 348/14.07 |
| 2020/0110572 A1* | 4/2020 | Lenke ...................... H04N 7/15 |

* cited by examiner

*Primary Examiner* — Melur Ramakrishnaiah
(74) *Attorney, Agent, or Firm* — Sheridan Ross P.C.

(57) ABSTRACT

Systems, methods, and software to provide intelligent detection and automatic correction of erroneous audio settings in a video conference. Electronic conferences can often be the source of frustration and wasted resources as participants may be forced to contend with extraneous sounds, such as background/ambient noises, or conversations not intended for the conference, provided by an endpoint that should be muted. Similarly, participants may speak with the intention of providing their speech to the conference while their associated endpoint is muted. As a result, the conference may be awkward and lack a productive flow while endpoints are erroneously muted or non-muted. By intelligently processing at least the video portion of a video conference, endpoints/participants may be prompted to mute/unmute or automatically muted/unmuted.

20 Claims, 17 Drawing Sheets

INTELLIGENT DETECTION AND AUTOMATIC CORRECTION OF ERRONEOUS AUDIO SETTINGS IN A VIDEO CONFERENCE

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for video-based communications and particularly to intelligently muting and unmuting an endpoint in a video conference.

BACKGROUND

It is common during a conference call to expect someone to speak and hear silence followed by, one or more other participants inquiring, "Are you on Mute?" Sometimes it is even necessary to communicate with the participant attempting to speak through a different channel (e.g., chat) and let them know that they are not being heard, most likely because they are still on mute. Other participants either move on, omitting the contribution from the attempted speaker, or wait until they are unmuted. Once the speaker realizes that he was talking on mute and unmutes, the speaker has to repeat anything that was said while on mute.

Conversely, moderators often need to announce, "Will those who are not speaking go on mute, please?" to avoid extraneous conversations and background noise picked up from the non-speaking participants' communication devices. The conference administrators may need to remind participants of this again and again throughout a conference. Extraneous noises may be a distraction or make understanding the intended content more difficult or even impossible. Furthermore, extraneous noises and unintentionally muted speakers lead to bad experiences for conference participants. The continuity or flow of the conference is interrupted and/or desired content may be omitted.

SUMMARY

Electronic conferences or meetings, with at least two participants communicating via communication endpoints over a network (herein, "conference" or "video conference") are common in business and other settings. Unfortunately, it is also common to have a speaker talking without realizing they're on mute, resulting in confusion, wasted time, and a disrupted video conference. It is also common to have extraneous noise picked up and inserted into the video conference from unmuted endpoints associated with participants that are not speaking and could be muted.

These and other needs are addressed by the various embodiments and aspects presented herein. The embodiments provide a number of advantages depending on the particular configuration.

In one embodiment, and as a general introduction to the embodiments herein, a system is provided to recognize the fact that an endpoint is providing extraneous audio to a video conference (e.g., the participant associated with an endpoint is not speaking, but the endpoint is providing audio to the video conference), and intelligently takes action; and/or the system that recognizes the fact the speaker is speaking on mute and similarly automatically takes action before any manual intervention is required to mute/unmute a participant in a video conference.

Certain prior art systems register a conference participant along with the endpoint terminal the participant is using to provide their audio and video for inclusion into the video conference. This allows the server to identify that the media stream(s) arriving at the server is from a particular participant. Such prior art systems may allow participants to see a list of all the conference participants and an indicium, such as highlighting, of the currently speaking participant. Similarly, when a participant is on mute, an indicium, such as a mute symbol (e.g., ), may be provided along with indicia of the participant, such as the participant's name, avatar, thumbnail, etc., to identify the participant as being muted. The embodiments provided herein go beyond the prior art systems and generally advance the state of the art. Additionally, if a participant is not sharing video, an indicium, such as  may be provided along with indicia identifying the participant.

In one embodiment, a system is provided to achieve an intelligent muting/unmuting of endpoints, which may be performed by a microprocessor(s) (herein, "processor") executing functions or modules, which may include one or more of:

1. Artificial Intelligence (AI) Driven Facial Movement Recognition and Analysis module: In one embodiment, a processor executes a module responsible for analyzing the video portion of the media stream received from an endpoint to determine whether the participant in the video portion is actively speaking or not speaking. The analysis may comprise making determinations on the movement of the participant's lips, other facial features involved in speech, direction of his gaze (e.g., towards vs. away from endpoint, elsewhere, etc.), and/or facial expressions. The analysis may further comprise determining how many, if any, individuals are detected in the video portion.

2. Natural Language Processing module: in one embodiment, a processor executes a module used to support the voice analysis and processing module described in #1 above, and audio analysis and processing module #3 described below. Here, the natural language processing module will process and analyze the conversation in the video conference in real time to determine context. For example, the captured speech is addressed to a specific participant in the video conference is identified from spoken names of the participants captured during the conference.

Once a particular participant's name is identified, such as from use during a portion of the video conference, natural language processing (NLP) may be utilized to determine the context of the sentence in which the name is used and whether that sentence is a question addressed to the participant or references a non-participant of the conference. This determination may be further used to strengthen the fact that the participant is now actively speaking or will be expected to speak (e.g., respond to a question) in the video conference.

3. Audio Analysis and Processing module: in one embodiment, a processor of a server executes a module to receive a stream of audio from a participant's endpoint. The audio portion may be analyzed for audio characteristics such as intensity/loudness, pitch, tone, etc. The audio stream is analyzed, preferably in real-time with other data, such as from the video analysis and processing module and/or the natural language processing module. Other data, such as participant rooster, conference agenda, etc. may also be used to enhance the determination of an active speaker in the video conference.

When the participant is connected to the conference using a soft client (or web client) and uses soft/web client to mute himself/herself, the data stream may still be passed to the conference server however the server does not broadcast the stream to other participants. Therefore, the participant may be speaking on mute, however, the server still has access to the stream of data coming from participant's endpoint/terminal.

The soft client would do a screening at its end before passing the data onto the server. The initial screening may include a check to determine if the intensity of the speech is beyond certain threshold, such as an audible limit of human, and filter out audio signals that are below this limit. Signals above the limited are passed on to the conference server.

When a participant is speaking on mute, the server uses the data received from the soft client to compare it against baseline data, such as training data and/or signals from the NLP module, to determine that the participant is actively speaking in the conference but is doing so on mute.

4. Confidence module: in one embodiment, a processor executes a module to execute an action upon receiving a confidence score associated with an action/alerting event. The module can proactively take actions, based on the confidence score, before, or to avoid, any manual intervention, including upon determining an active participant is speaking on mute:

Very low confidence score: Take no action.

Low confidence score: Trigger the presentation of a visual indicator by the participant's endpoint indicating that they are speaking on mute.

Medium: Trigger an audible announcement by the participant's endpoint that they are speaking on mute.

High: Automatically unmute the participant's audio, as permitted based on legal considerations.

When a determination is made that audio provided, while the endpoint is not on mute, is not for inclusion in the conference, the specific level of confidence may result in a particular action, including:

Very low confidence score: Take no action.

Low confidence score: Trigger the presentation of a visual and/or audible cue by the participant's endpoint indicating that they are providing audio to the conference and may need to be muted.

Medium: Trigger the presentation of a visual and/or audible announcement that they are generating noise provided to the conference and should go on mute if not participating in the conference.

High: Automatically mute the participant's endpoint.

In addition to automatically determining a threshold confidence score, the participant, conference moderator, or other administrator may configure the threshold values and/or disable automatic muting/unmuting with or without announcement functions announcing or indicating the participant should manually initiate muting/unmuting their endpoint. It may be necessary or beneficial to warn participants that, when muted, their audio will be monitored, but that such monitoring is solely for the determination of whether audio provided while on mute, indicates the audio should be unmuted, or vice versa, such as in accordance with the law/legal rules imposed by the local countries/geographies in which the invention will be used.

The data gathered as described above, may then be used to train one or more Machine Learning (ML) models. To reduce false positives, filtering may be performed, such as to exclude sound outside the audible level of humans. This data is used in subsequent video conferences.

In another embodiment, with training data and the incoming real time stream (e.g., video and audio) from a participant's endpoint, the confidence module assigns a confidence score reflecting the confidence that the participant is actively speaking, to provide the speech to the conference, but is on mute. In response to the confidence score being above a previously determined threshold, an alerting event is created and sent to the conference server, such as an alerting module (see below).

5 Alerting/Muting module in one embodiment, a processor executes a module to send a notification to an endpoint regarding a muted/unmuted state. For example, the notification may be sent before or after the muting action is performed. The alert/notification may comprise at least one of: a textual, visual, and/or audible alert.

Additionally, the system may include a Conference Participant registration and identification module: in one embodiment, when a participant joins a conference, a processor of a conferencing server or system registers the participant along with the endpoint terminal that the participant is using. This allows the server to associate the media stream(s) (e.g., audio and video portions) arriving at the server is from a particular endpoint/participant. As described herein, at least one processor of the conference server may execute components/modules in order to determine if a participant's endpoint should be automatically unmuted or other action (e.g., transmit notification to unmute) should be taken in response to determining that a participant is likely speaking, with intent of having the speech included in the conference, but is currently muted. In addition, the conference server may determine if a participant's endpoint should automatically be muted or automatically notified to go on mute in response to determining that the audio portion from an endpoint is extraneous to the video conference (e.g., the participant's speech is not intended for the video conference, speech is indiscernible, audio comprises background noise, etc.).

The embodiments herein provide for the analyzing the participants' contributed audio and/or video using NLP/Artificial Intelligence (AI), which may also include machine learning, deep learning, or other machine intelligence and voice recognition techniques to make a determination that the user is not speaking in the video conference, but is contributing audio (e.g., noise, extraneous speech, etc.) to the video conference and automatically take appropriate action before any manual intervention is required, thus preserving the rich user experience of participants in the video conference.

Other embodiments herein provide for the analyzing the participants' contributed audio and/or video to make a determination that the user is actually speaking on mute in the video conference and automatically take appropriate action by the system without any manual intervention, thus preserving the rich user experience of participants in the video conference. NLP or other machine intelligence may be utilized to parse a sentence spoke by one participant that addressees or references another participant. For example, asking a question directed to another participant (e.g., "Let's look at the document. Do you have it ready, Alice?") is a question directed to Alice and, as a result, the endpoint utilized by Alice should be responding. If not, an alert/notification may be sent to the endpoint. In some embodiments, the endpoint may be automatically unmuted. If the NLP determines the reference is not directed to another participant (e.g., "Let's look at the document shared by Alice.") then the endpoint utilized by Alice may not be expected to respond and the current mute/unmuted state left unchanged.

Various embodiments and aspects of the embodiments are disclosed, including:

In one embodiment, a video conference server is disclosed. The video conference server comprising: a network interface to a network; a storage component comprising a non-transitory storage device; a processor, comprising at least one microprocessor; and wherein the processor, upon accessing machine-executable instructions, cause the processor to perform: broadcast conference content, via the network, to each of a plurality of endpoints, wherein the conference content comprises an audio portion and a video portion received from each of the plurality of endpoints; intelligently process at least the video portion from at least one endpoint to determine whether a corresponding audio portion is extraneous to the conference content; and upon determining that the corresponding audio portion is extraneous to the conference content, execute a muting action to exclude the corresponding audio portion from the conference content.

In another embodiment, a method of intelligently muting an endpoint in a video conference is disclosed. The method comprising: broadcasting conference content to each of a plurality of endpoints, wherein the conference content comprises an audio portion and a video portion received from each of the plurality of endpoints; intelligently processing at least the video portion from at least one endpoint to determine whether the corresponding audio portion is extraneous to the conference content; and upon determining that the corresponding audio portion is extraneous to the conference content, executing a muting action to exclude the corresponding audio portion from the conference content.

In another embodiment, a method of intelligently unmuting an endpoint in a video conference is disclosed. The method comprising: broadcasting conference content to each of a plurality of endpoints, wherein the conference content comprises an audio portion and a video portion received from each of the plurality of endpoints; intelligently processing at least the video portion from at least one endpoint to determine whether a participant is unintentionally muted; and upon determining that the participant may be unintentionally muted, executing signaling to an endpoint associated with the unintentionally muted participant to cause the associated endpoint to prompt the unintentionally muted participant to unmute their audio.

Aspects of any one or more of the foregoing embodiments include the video conference server automatically muting an endpoint associated with the corresponding audio portion; and transmitting a message to the automatically muted endpoint indicating that the endpoint was automatically muted.

Aspects of any one or more of the foregoing embodiments include the video conference server signaling an endpoint associated with the corresponding audio portion to cause the associated endpoint to prompt a participant to mute their audio.

Aspects of any one or more of the foregoing embodiments include the video conference server to automatically mute an endpoint associated with the corresponding audio portion when a confidence score is above a threshold.

Aspects of any one or more of the foregoing embodiments include the video conference server determining that a participant in the at least the video portion is speaking but not looking at their screen.

Aspects of any one or more of the foregoing embodiments include the video conference server determining that a participant in the at least the video portion is not speaking and/or the corresponding audio portion does not comprise speech.

Aspects of any one or more of the foregoing embodiments include the video conference server determining that there is no person in the at least the video portion.

Aspects of any one or more of the foregoing embodiments include the video conference server determining that audio is being shared from the at least one endpoint; and determining at least one of: the participant's lips are not moving, the participant's other facial parts do not indicate speech, and/or the participant's facial expressions do not indicate speech.

Aspects of any one or more of the foregoing embodiments include the video conference server intelligently processing at least the video portion from at least one endpoint to determine whether a participant is unintentionally muted; and upon determining that the participant may be unintentionally muted, signaling an endpoint associated with the unintentionally muted participant to cause the associated endpoint to prompt the unintentionally muted participant to unmute their audio.

Aspects of any one or more of the foregoing embodiments include the video conference server determining that the at least one endpoint is muted, the participant associated with the at least one endpoint is looking at the camera and/or screen, and at least one of: the participant's lips are moving, the participant's other facial parts indicate speech, and/or the participant's facial expressions indicate speech.

Aspects of any one or more of the foregoing embodiments include the video conference server intelligently processing at least the audio portion from at least one endpoint to determine a name associated with a particular conference participant was spoken; and upon determining that the name associated with the particular conference participant was spoken, transmitting to an endpoint associated with the particular conference participant a prompt to unmute their audio.

Aspects of any one or more of the foregoing embodiments wherein the prompt comprises at least one of: a textual, visual, and/or audible alert.

Aspects of any one or more of the foregoing embodiments include sending a signal to an endpoint associated with the corresponding audio portion to cause the associated endpoint to prompt a participant to mute their audio.

Aspects of any one or more of the foregoing embodiments include automatically muting an endpoint associated with the corresponding audio portion when a confidence score is above a threshold.

Aspects of any one or more of the foregoing embodiments include determining that a participant in the at least the video portion is speaking but their gaze is not direct to their device.

Aspects of any one or more of the foregoing embodiments include determining that a participant in the at least the video portion is not speaking and/or the corresponding audio portion does not comprise speech.

Aspects of any one or more of the foregoing embodiments include determining that the at least one endpoint is muted, the participant is looking at the camera and/or screen, and at least one of: the participant's lips are moving, the participant's other facial parts indicate speech, and/or the participant's facial expressions indicate speech.

Aspects of any one or more of the foregoing embodiments include intelligently processing at least the audio portion from at least one endpoint to determine a name associated with a particular conference participant was spoken; and upon determining that the name associated with the particular conference participant was spoken, signaling an endpoint associated with the particular conference participant to prompt particular conference participant to unmute their audio.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium that, when read by a microprocessor, cause the microprocessor to execute the instructions encoded therein.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a sub-element identifier when a sub-element identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
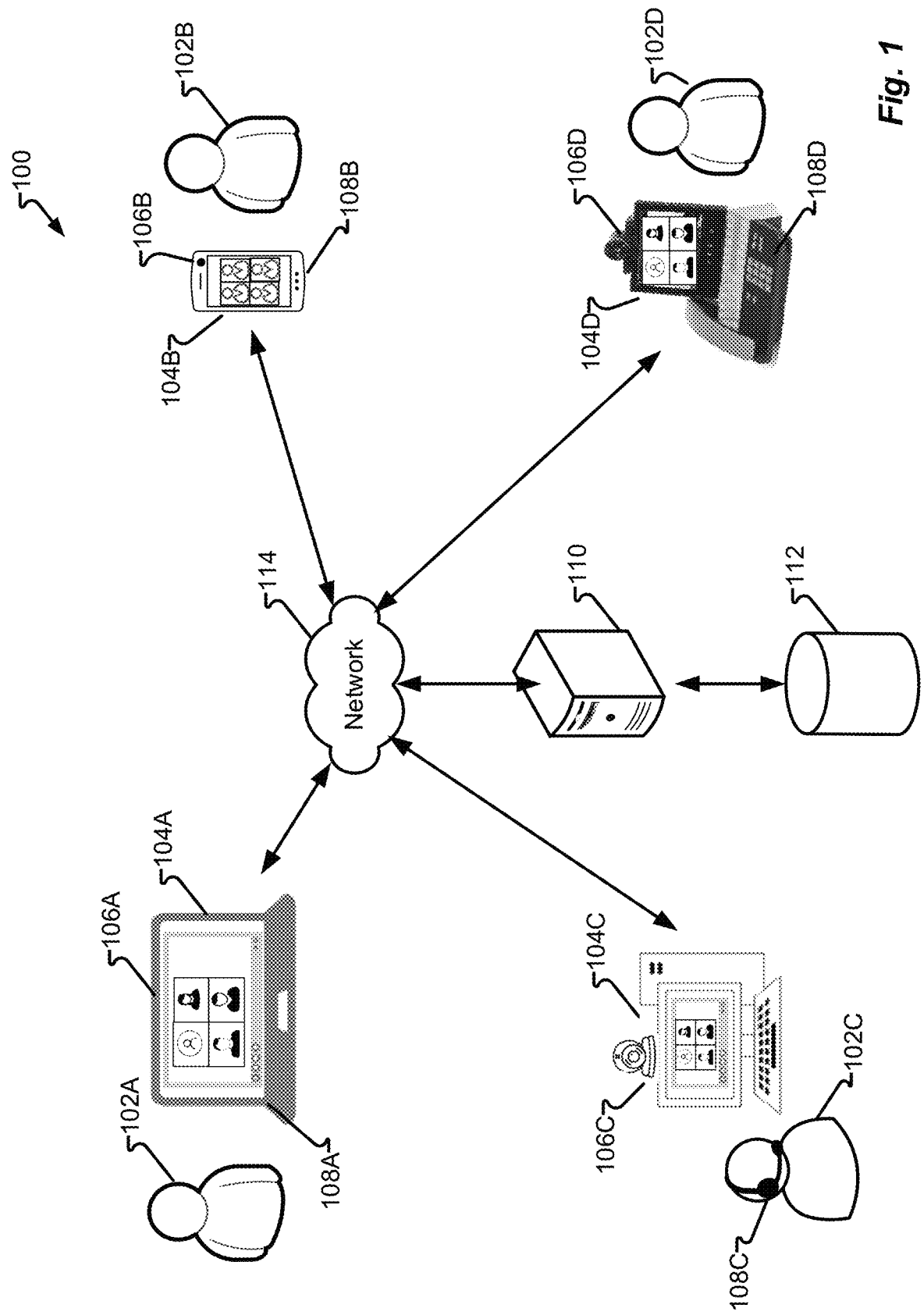
FIG. 1 depicts a first system in accordance with embodiments of the present disclosure.

FIG. 1 depicts a system 100 in accordance with embodiments of the present disclosure. In one embodiment, a video conference is established and maintained between participants 102 (e.g., participants 102A-D) wherein audio, video, documents, co-browsing, and/or other media, is broadcast to each of the participants 102A-D. The audio portion of the conference may comprise audio in the form of speech provided by one or more of participants 102A-D. In addition to the audio portion, each participant may contribute a video portion, comprising video provided by one or more of participants 102A-D. It should be appreciated that the number of participants illustrated by the participants 102A-D is non-limiting and may comprise any number of two or more participants, wherein at least one of the participants 102A-D provides or attempts to provide a portion of the audio/video content of the conference. As will be discussed more completely with respect to the embodiments that follow, the audio content provided at any time by any of participants 102A-D may be extraneous to the conference and intelligently muted.

The participants 102A-D, or at least a non-zero subset of the participants 102A-D, receive the video conference as broadcast by a server 110 via a network 114. The server 110 may have or utilize a data storage 112 as a non-transitory repository of data accessible to at least one microprocessor (or, more simply, "processor") of the server 110. The server 110 may be a stand-alone component or co-embodied with other components, such as to manage communications, participant attendance, timing, receiving/contributing permissions, floor control, and/or other administrative and/or connectivity features. For example, audio and video transmitted by the participant 102A, via an endpoint 104A (including, for example, a camera 106A and a microphone 108A), is broadcast back to each endpoint 104A-D participating in the video conference. Optionally, audio provided by one endpoint (e.g., the endpoint 104A) may be excluded from the broadcast provided to the providing endpoint (e.g., the endpoint 104A) for the purpose of avoiding echo, feedback, or otherwise being a distraction to the participant 102A hearing their own voice, which may be subject to a delay.

The server 110 may comprise or access, telephony or other communication equipment (e.g., switches, hubs, routers, etc.) in order to facilitate broadcasting the video conference and receiving portions of the conference content from any of the participants 102A-D providing conference content. In another embodiment, the server 110 and/or the data storage 112 may be embodied as one of endpoint 104.

The participants 102A-D may provide conference content via a respective endpoint 104A-D that converts encoded audio and video signals broadcasts via the network 114 from the server 110 and vice versa. Optionally, one or more of the endpoints 104A-D may similarly present text messages, documents, co-browsing signals, etc. to and/or from the server 110. Each of the endpoints 104A-D configured to contribute audio and video to the video conference comprises and/or utilizes a microphone 108 to capture mechanical wave energy (e.g., sound), and a camera 106 to capture images, such as from an associated participant 102 and converts the sound and images into electrical signals which may be further converted to data packets for transport via the network 114.

Examples of the endpoint 104, the associated microphone 108, and the associated camera 106 include, but are not limited to, endpoints 104A through 104D. The endpoints 104 may be embodied as, for example, a laptop 104A with an attached microphone 108A, and attached camera 106A; a smart phone 104B that includes a camera 106B, and a speaker/microphone 108B; a personal computer 104C with a headset/microphone 108C connected wired or wirelessly, and a camera 106C connected wired or wirelessly; and a video phone 104D that includes a camera 106D, and speaker/microphone 108D. The endpoints 104A-D are associated with participants 102A-D, respectively. It should be appreciated by those of ordinary skill in the art that other microphones may be utilized as the microphone 108, such as a handset of a telephone, which may be a wired (analog or digital) or wireless (e.g., cellular, WIFI, two-way radio, etc.) endpoint to the network 114. Similarly, the endpoint 104 may be embodied as any telecommunications device operable to receive a video conference broadcast from the server 110 via the network 114 and present the video conference to one or more of the participants 102A-D and optionally provide an audio and video portion for incorporation by the server 110 into the conference content.

As more and more users across the world adopt a remote working culture, conferencing, and particularly video conferencing is becoming increasingly more common. During these video conferences background noise or other noises from users not speaking to the video conference may cause distractions. In this situation, a conference administrator may ask "Can those who are not speaking can go on Mute please?" It's not uncommon that the conference administrator(s) will need to make this request multiple times during a single conference. Another issue is a user speaking while on mute and not being heard. This may result in other users asking, "Are you on mute?" or "Is my audio working? I can't hear anything." The other users have to wait until the muted speaker is unmuted, and after the muted speaker is unmuted, the speaker has to repeat what was said while on mute. These exchanges are quite common and do not result in an efficient and effective conference. These disruptions interrupt the continuity/flow of the video conference.

A much richer experience may be provided to the conference participants if the video conference system was able to automatically detect that a speaker is muted while speaking into the video conference, or the user is not speaking into the conference but contributing unintended noise (e.g., background noise, speaking to someone outside the video conference, etc.) to the video conference since the user is not muted. After intelligently detecting that a participant should be muted/unmute, the video conferencing system may automatically and intelligently take action without requiring manual intervention from the conference administrator/other participants. In some example, the video conferencing system may utilize technologies, such as Artificial Intelligence, especially Deep Learning, Image Recognition and Natural Language Processing to intelligently detect that a participant should be muted/unmuted.

In some embodiments, the AI Driven Facial Movement Recognition and Analysis module might employ one or more AI Vision libraries which will be trained with numerous samples of the human facial structure and facial characteristics in order for the module to recognize different parts of any newly provided facial image and identify the movements of the different facial portions in that image. An artificial neural network may be used to achieve this. NLP may also be based on Machine Learning and the NLP module will also be sufficiently trained, in some cases with the language/terminology of a particular domain in which the conference system will be used. These components may also be services hosted in the cloud as provided by 3rd party cloud service providers.

For example, the participant 102A may be trying to speak to the video conference, however the participant 102A may inadvertently be on mute, and the other participants 102B-D in the video conference are unaware of the contribution attempted by participant 102A. Conversely, the participant 102B may be contributing sound that is extraneous to the conference. The sound may be speech directed to another party not engaged in the conference or other unwanted noise (e.g., background noise, tapping, humming, etc.). The participant 102B may mistakenly believe they are on mute or that the unwanted noise is being picked up by the associated microphone 108B. As a result, other participants (e.g., the participants 102A, 102C, 102D) may find the unwanted noise distracting or difficult to hear the active speaker in the video conference. In the preceding examples, resources are often wasted, and the flow of the conference interrupted until the participant 102B is properly muted/unmuted.

Figure 2:
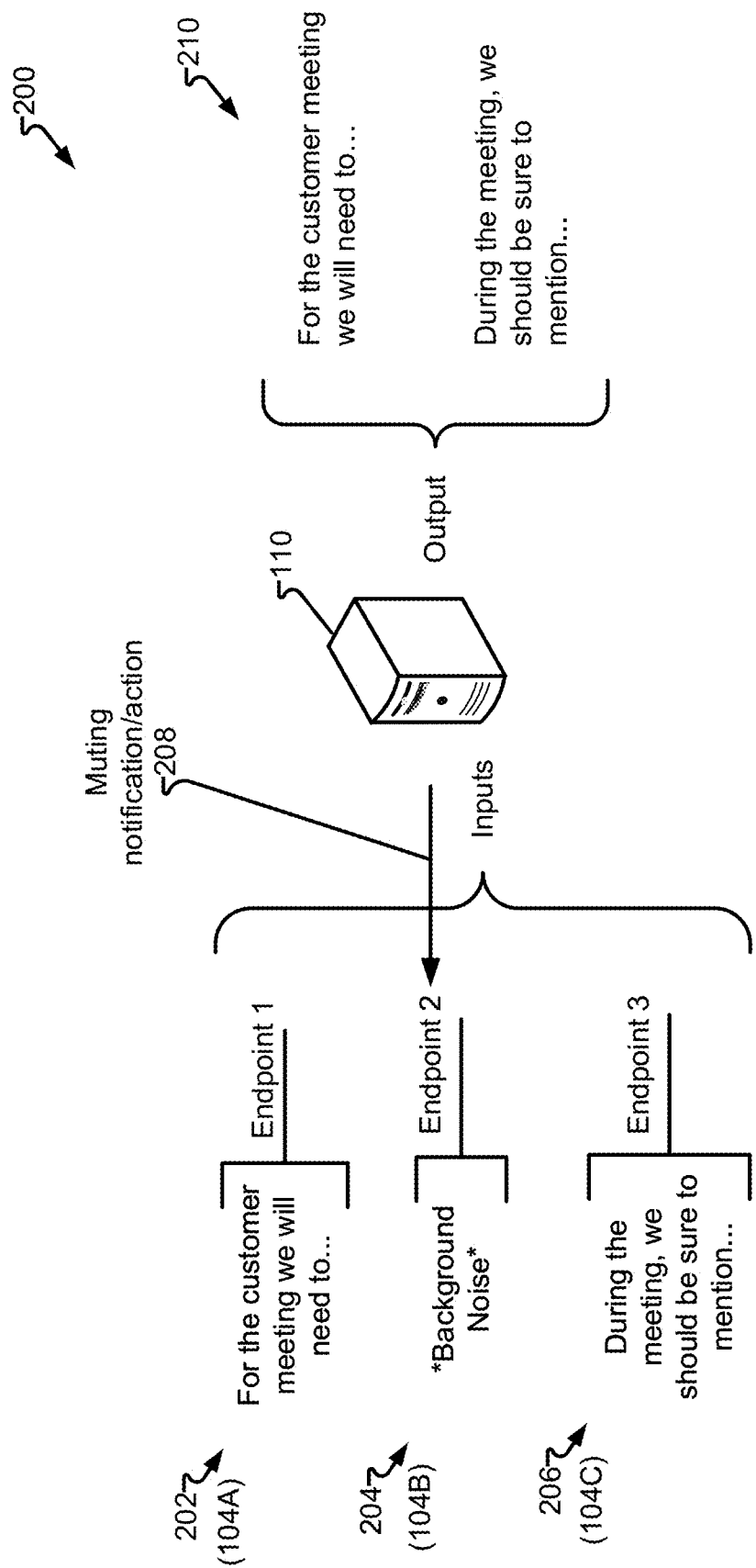
FIG. 2 depicts a first interaction in accordance with embodiments of the present disclosure.

FIG. 2 depicts an interaction 200 in accordance with embodiments of the present disclosure. It should be appreciated that the nature of this paper necessitates that spoken content and other sounds, which may be embodied as sound waves or as encoded electrical signals or data packets, be represented as text. This representation using text should not be confused with actual text (e.g., text chat, Short Message Service (SMS), email, etc.). While the sending and receiving of text may be optionally utilized and incorporated into the video conference content, text-based communications are outside the scope of the embodiments provided herein. Also, each of interactions 200 and 300 (see FIGS. 2 and 3A-B) illustrate certain features and actions of the system 100 and components thereof (see FIG. 1) and omits other features and actions to avoid unnecessarily complicating the figure and associated description.

In one embodiment, the server 110 is presenting conference content 210 comprising audio and video content transmitted to the participants 102A-D via their respective endpoint 104A-D. The video portion of the conference content is not depicted in FIG. 2 to avoid unnecessarily complicating the figure and associated description. The audio portion of the conference content 210 comprises audio 202, 204, and 206 contributed, continuously or intermittently, by one or more endpoints (e.g., the endpoints 104A-C) and an associated or integrated microphone 108.

In one embodiment, the endpoint 104A provides the audio 202 to the server 110 which in turn broadcasts the conference content 210 now comprising the contributed speech (e.g., the audio 202). Similarly, the endpoint 104C provides the audio 206 to the server 110 which in turn broadcast the conference content 210 now comprising the contributed speech (e.g., the audio 202). The endpoint 104B provides the audio 204 (e.g., background noise) to the server 110.

Upon the server 110 determining that audio 204 is extraneous to the conference, the server 110 performs a muting action to exclude the audio 204 from the conference content 210. The determining that sound, such as the audio 204, is extraneous to the conference is discussed more completely with respect to the embodiments that follow. In one embodiment, the server 110 sends a muting notification/action signal 208 to the endpoint 104B and, in response, the endpoint 104B activates a notification circuit or logic to prompt the participant 102B to manually activate a muting feature of the endpoint 104B and/or automatically activate a muting feature of the endpoint 104B. In one embodiment, the muting feature allows sound to continue to be captured and sent from endpoint 104B to the server 110, but the server 110 excludes the sound from the conference content 210. In other embodiments, the muting notification/action signal 208 may further include signaling the endpoint 104B that they have been placed on mute and/or all the endpoints 104A-D that the endpoint 104B is on mute. Although the server 110 may automatically mute a participant (e.g., the participant 102B), in some examples, the server may not automatically unmute a participant 102 (e.g., the participant 102B) due to privacy and/or legal concerns.

Figure 3A:
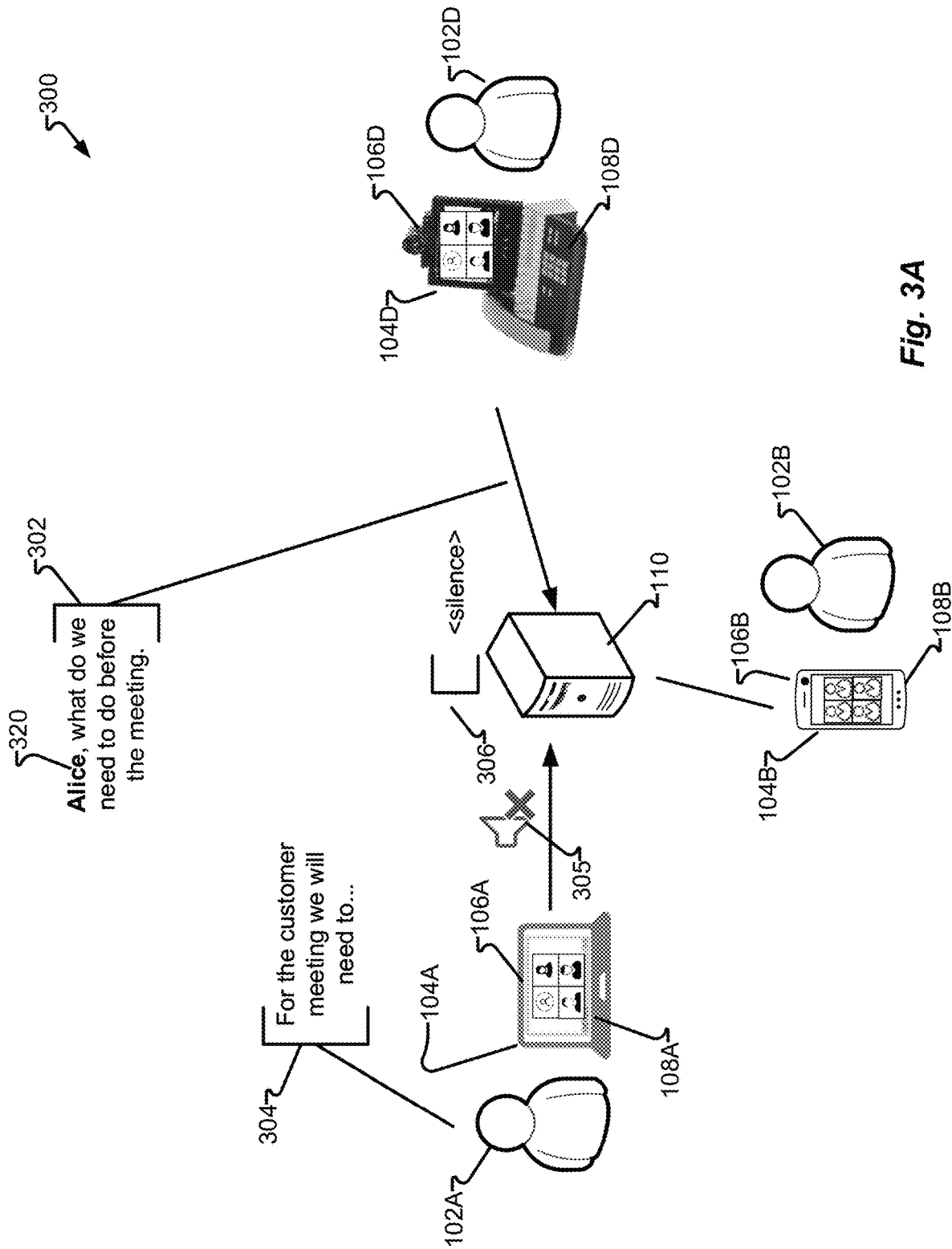
FIGS. 3A-3C depict a second interaction in accordance with embodiments of the present disclosure.
Figure 3B:
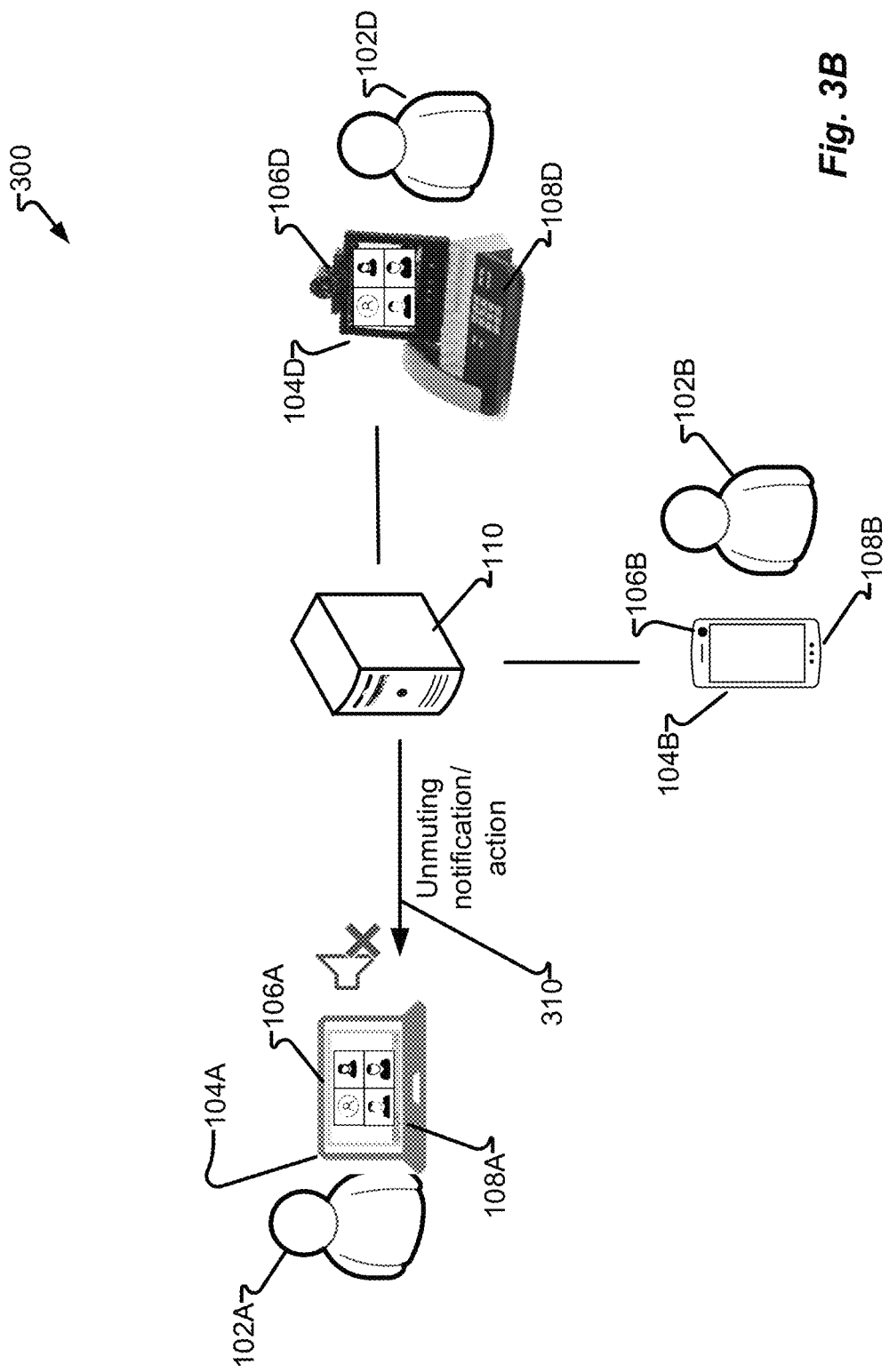

FIGS. 3A-3B depict an interaction 300 in accordance with embodiments of the present disclosure. As illustrated in FIG. 3A, the participant 102D provides an audio portion 302, "Alice, what do we need to do before the meeting?" to the server 110. The participant 102A (e.g., Alice), via a microphone 108A and an endpoint 104A, contributes an audio portion 304 (e.g., speech) "For the customer meeting we will need to . . . ." However, the endpoint 104A is muted, such that the audio portion 304 is not received by the server 110, and the other participants 102 (e.g., the participants 102B, 102D) only hear audio portion 306 (e.g., <silence>).

The video conference system running on the server 110 may intelligently determine that the participant 102A is attempting to speak into the video conference. In one example, the server 110 may use Natural Language Processing (NLP) or other speech recognition method to detect a name/keyword 320 was spoken. In this example, Alice is the name of the participant 102A, spoken by the participant 102D. The NLP may further determine that a response from Alice (e.g., the participant 102A) is expected. As will be discussed in more detail with respect to the embodiments that follow, other criterion may be used when determining whether a particular endpoint 104 is erroneously muted. NLP may be utilized to indicate that a participant is being addressed and a response is expected (e.g., "Let's look at the document and turn over to Alice.", "Alice, please go over the document.", "Alice, can you explain the document?", etc.) versus merely mentioning a participant (e.g., "Let's look at the document Alice provided.", etc.).

In another example, the server 110 may intelligently analyze the video portion contributed by the participant 102A to determine that the participant 102A is speaking into the video conference (e.g., gaze directed towards the endpoint 104A and lips moving). To avoid having audio portion 304 excluded from the conference content due to the endpoint 104A inadvertently being on mute, the server 110 may determine that the endpoint 104A is erroneously muted and, in response, executes an unmuting notification/action 310 to cause the audio portion 304 to be included in the conference content, as illustrated in FIG. 3B. In some embodiments, the server 110 may also buffer the audio portion 304 from the endpoint 104A and play the buffered audio portion 304 once the participant 102A has unmuted.

Figure 3C:
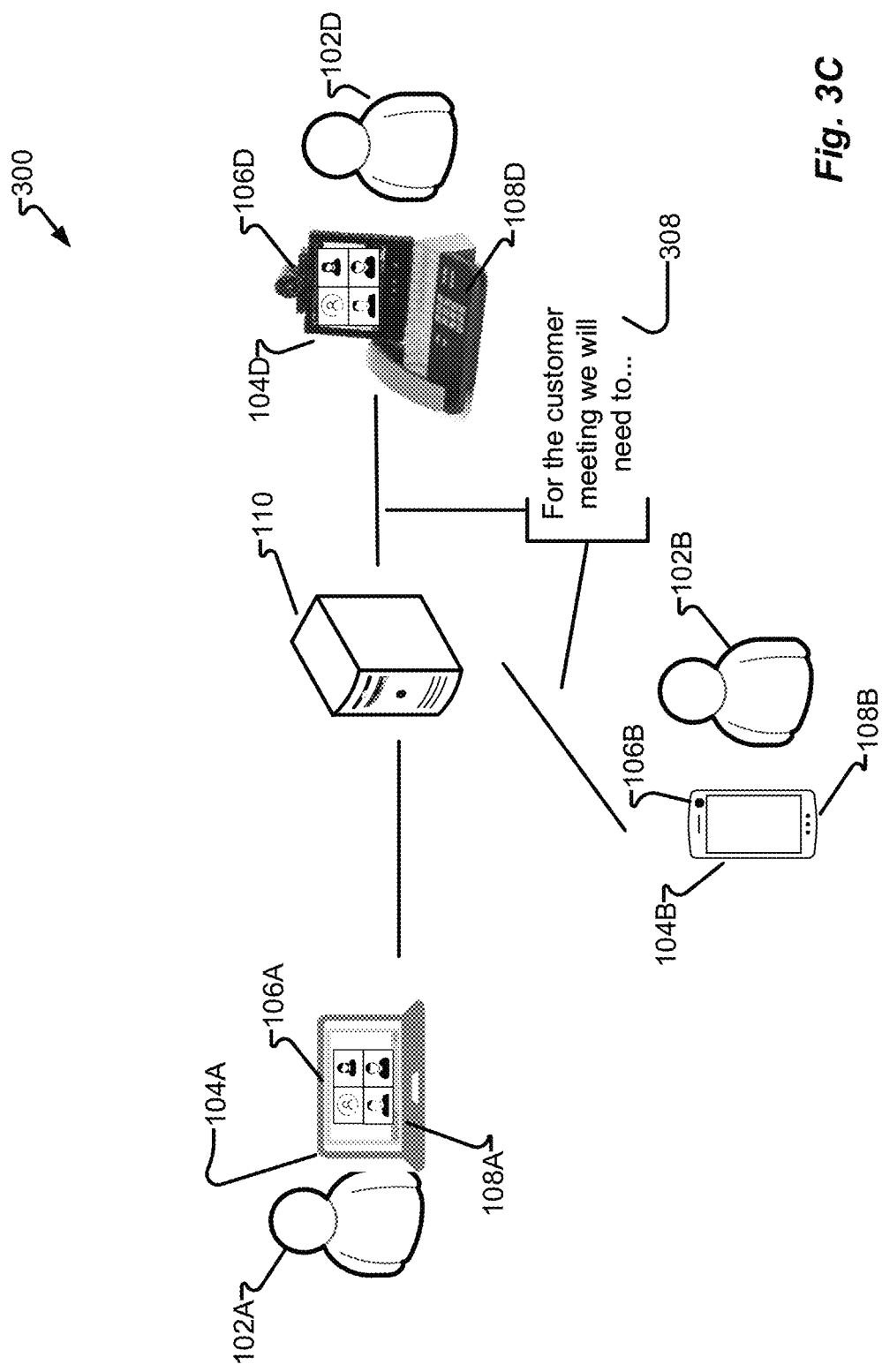

In one embodiment, the unmuting notification/action 310 may comprise energizing a circuit or logic of the endpoint 104A to notify the participant 102A that they are on mute and/or prompt the participant 102A to manually unmute the endpoint 104A. For example, the endpoint 104A may play a generated or recorded message or tone and/or provide a visual prompt on a display associated with the endpoint 104A (e.g., "Alice, you are on mute."). As a further option, the endpoint 104A may replay all or a portion of the audio portion 302. Replaying all or a portion of the audio portion 302 re-prompts the participant 102A to provide a response. If the participant 102A did provide a response, such as while on mute, a recording may be made of the audio portion 304 received while on mute and replayed into the conference. For example, the participant 102A may begin providing the audio portion 304, by saying a word or two (e.g., "For the . . . "), while the endpoint 104A is on mute. After the endpoint 104A is unmuted, the server 110 may buffer the words provided after the endpoint 104A is unmuted and the recorded speech followed by the buffered speech may be played back into the conference as conference content (e.g., conference content 308) until the audio portion 304 is live. If the audio portion 304 provided during muting is more than a few words (e.g., more than ten seconds), then the user 102A may be prompted to either initiate the playback the audio portion 304 provided while on mute or repeat the audio portion 304 again. Once a participant 102 (e.g., the participant 102A) is unmuted, the unmuting notification/ action 310 may further comprise a notification that the participant 102 is off mute (e.g., tone, message, pop-up message, etc.). As a further option, all endpoints (e.g., the endpoints 104A-D) may be notified of the on-mute/off-mute state of the endpoints 104 and, when changed, each endpoint 104 is updated accordingly, such as with a message (e.g., "Alice is on mute" or "Alice is off mute") or a graphical icon having a meaning associated with the muting state. As illustrated in FIG. 3C, optionally, the audio portion 304 may be buffered and replayed as the conference content 308, so that any speech provided before the unmuting notification/ action 310 results in the unmuting of the endpoint 104A, is provided as uninterrupted speech but with a delay determined by the beginning of the audio portion 304 and the occurrence of the unmuting action. In such an embodiment, the audio portion 304 may be provided in real-time, and may be buffered and only the buffered content provided as the conference content 308. An unmuting action (e.g., the unmuting notification/action 310) may terminate the buffering. Once the buffered content is played, the real-time speech may be provided as the conference content 308, such as to provide the best experience for the conference participants.

Figure 4:
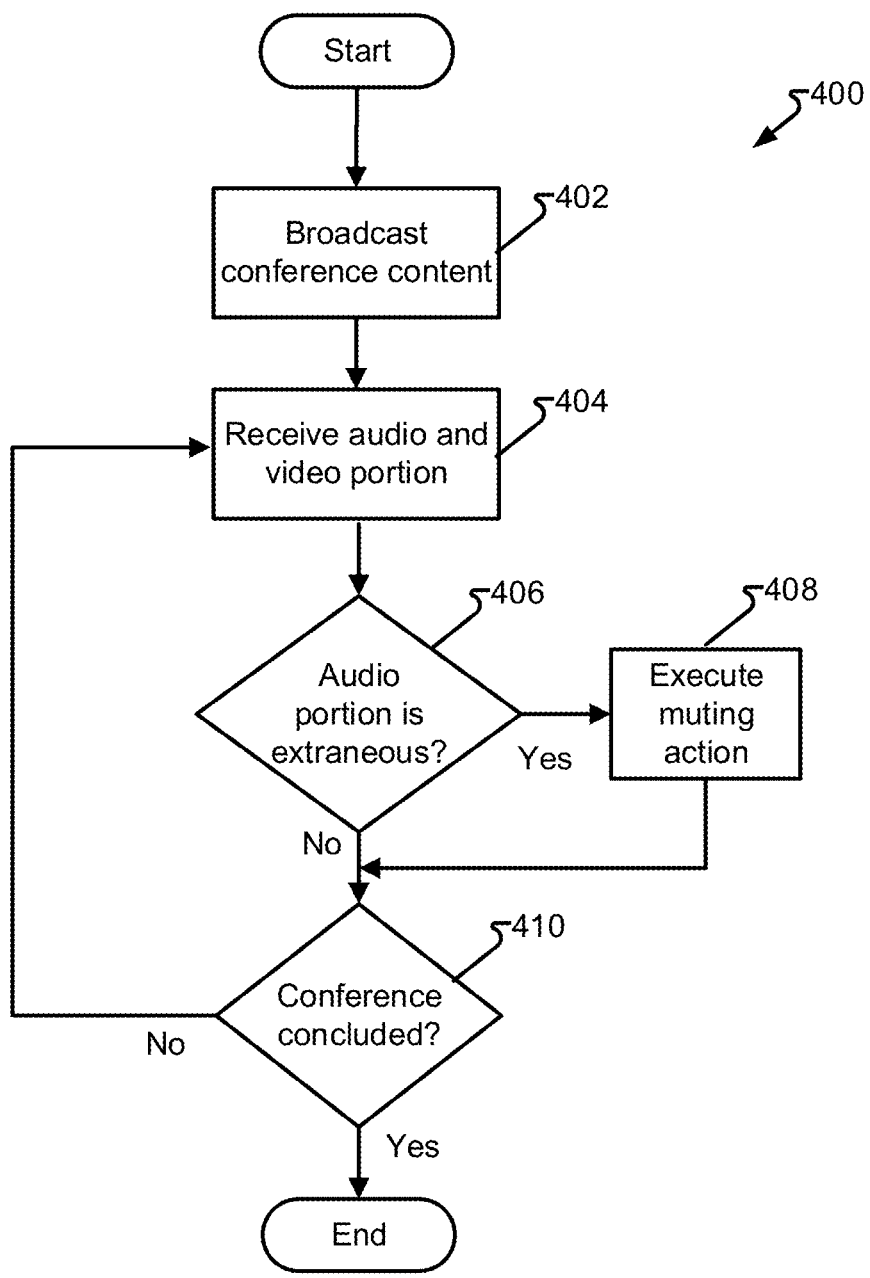
FIG. 4 depicts a first process in accordance with embodiments of the present disclosure.

FIG. 4 depicts a process 400 in accordance with embodiments of the present disclosure. The process 400 may be embodied as an algorithm encoded as machine-readable instructions that, when read by a processor, such as a processor of the server 110, cause the processor to execute the steps of the algorithm. In one embodiment, the process 400 determines that audio being received from a particular endpoint 104 engaged in a conference is extraneous to the conference and should be excluded from the conference content.

In one embodiment, the process 400 broadcasts conference content (e.g., an audio and a video portion) to participants 102 in step 402, such as by the server 110 broadcasting the conference content to each endpoint 104 for presentation to an associated participant 102. Step 402 initiates or continues broadcasting conference content and may be performed continuously, while other steps of process 400 are executed, until the conference is concluded. The conference content comprises audio and video received in step 404 from one or more individual endpoints 104. A test 406 determines if the audio received by a particular endpoint 104 is extraneous to the conference and, if determined in the negative, processing continues to a test 410. If the test 406 is determined in the affirmative, processing continues to step 408 wherein the audio received by the particular endpoint 104 is muted to exclude current and/or future audio received from the endpoint from being broadcast in step 402. Muting may be performed automatically by a processor of a server, such as the server 110 providing the conference content, or by a signal to the particular endpoint 104 to execute a mute circuit that, when received by the associated participants 102, performs the muting action. Test 410 determines if the conference has concluded and, if determined in the affirmative, the process 400 may end and the broadcasting of the conference content initiated/continued in step 402 may be discontinued if not already terminated, otherwise processing may continue and loop back to step 404.

The test 406 is variously embodied to determine that audio received from the particular endpoint 104 is extraneous to the conference. For example, the audio received from the particular endpoint 104 may comprise non-speech sound above a certain threshold level (e.g., volume) or duration (e.g., FIGS. 6A-6B). This may include environmental noise (e.g., street, tapping of a pen, office equipment, restaurant background noise, animals, baby crying, children playing, etc.) and be excluded for not comprising speech or not comprising sufficient comprehensible speech. Audio analysis is performed on the incoming audio, which may be analyzed for various characteristics of the human voice such as intensity, volume, tone, pitch, range and optionally language if it is same as the language of conference. As an example, the intensity of human voice is 50-70 decibels while the intensity other sounds such as dog barking or a vehicle honking etc. is much higher around 90 decibels.

The audio received from the particular endpoint 104 may comprise speech but be excluded from the conference content as the speech is further determined to be extraneous to the conference. For example, the speech may be the din of an office setting where the speech of others forms a din of noise and the speech is partially or entirely incomprehensible. Comprehensible speech may still be determined to be extraneous to the conference and excluded from the conference content, which will be discussed more completely with respect to FIGS. 7A-7B and 9A-9B.

Figure 5:
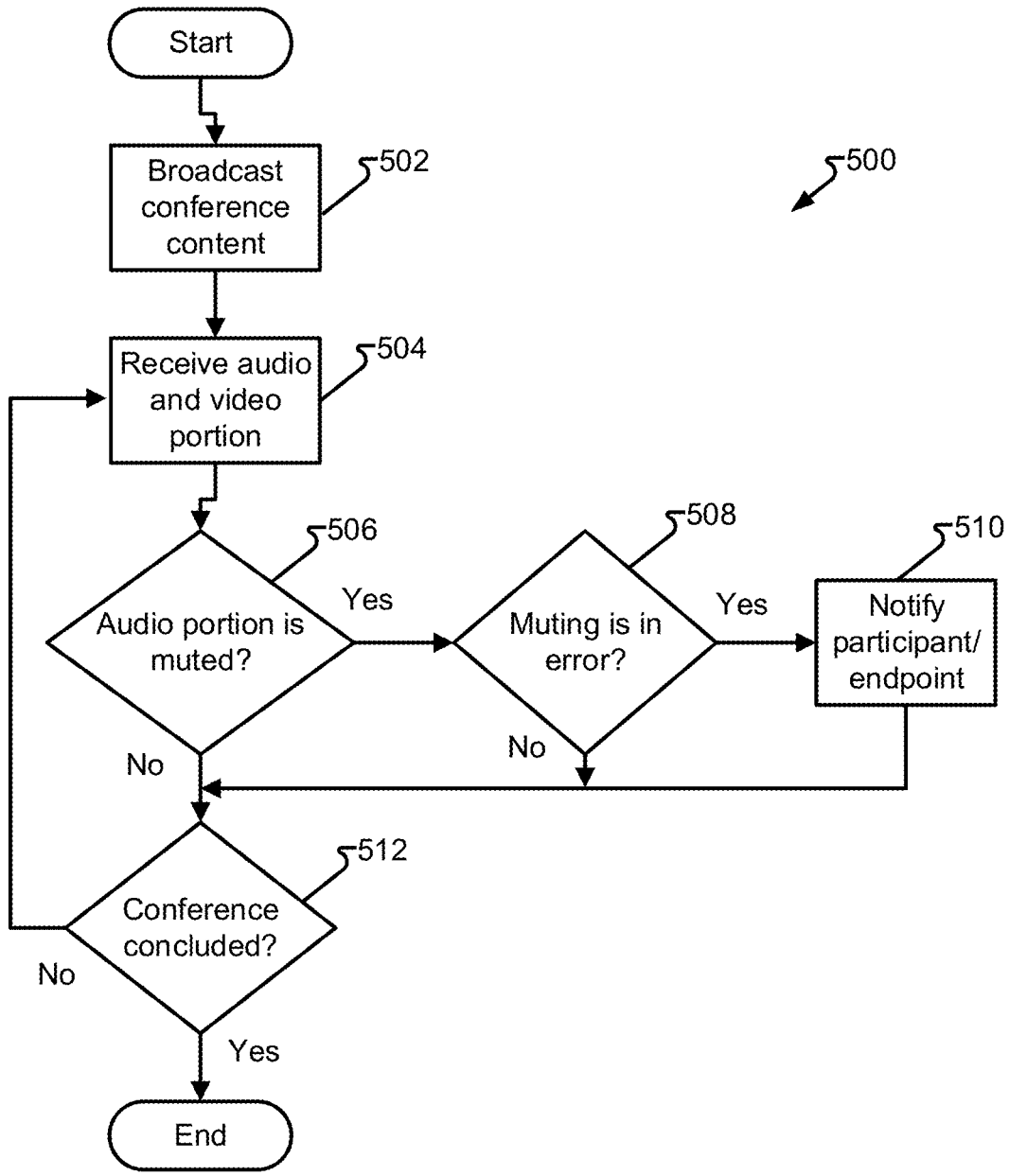
FIG. 5 depicts a second process in accordance with embodiments of the present disclosure.

FIG. 5 depicts a process 500 in accordance with embodiments of the present disclosure. The process 500 may be embodied as an algorithm encoded as machine-readable instructions that, when read by a processor, such as a processor of the server 110, cause the processor to execute the steps of the algorithm. In one embodiment, the process 500 determines that a participant may be erroneously muted and should be notified to unmute.

In one embodiment, the process 500 broadcasts conference content to participants in step 502, such as by the server 110 broadcasting the conference content to each endpoint 104 for presentation to an associated participant 102. Step 502 initiates or continues broadcasting conference content and may be performed continuously, while other steps of process 500 are executed, until the conference is concluded. The conference content comprises audio and/or video received in step 504 from one or more individual endpoints 104.

A test 506 determines if a particular participant 102/endpoint 104 is trying to transmit audio while the particular endpoint 104 is on mute. In some embodiments, the server 110 receives the audio portion but does not transmit the audio portion of participants on mute. In other embodiments, when a participant is muted, the server 110 does not receive audio for the associated endpoint 104. If the test 506 is determined in the negative, the process 500 continues to a test 512, which determines if the conference has concluded. If the test 512 is determined in the affirmative, the process 500 may end and the broadcasting of the conference content initiated/continued in step 502 may be discontinued if not already terminated, otherwise processing may continue and loop back to step 504. The test 506 may determine that the particular participant 102/endpoint 104 is on mute and attempting to transmit audio while on mute (step 508). For example, the server 110 may detect a muting signal by the particular endpoint 104 and the muting thereof provided by the server 110. In another embodiment, muting may be provided by the particular endpoint 104 itself wherein the server 110 receives a signal indicating that audio is being received by the particular endpoint but not forwarded to the server 110 due to being on mute.

If the test 506 is determined in the affirmative (e.g., particular endpoint 104 is muted), a test 508 determines whether the muting is in error (e.g., FIGS. 3A-3C and 8A-8C) and, if determined in the affirmative, executes step 510 to execute a notification action. If the test 508 is determined in the negative, processing may continue to the test 512. Step 510 may send a visual and/or audio notification (e.g., tone, message, pop-up message, other visual indication, etc.) to the erroneously muted endpoint 104 to unmute. If permitted, step 510 may automatically unmute the erroneously muted endpoint 104, and the audio received from the particular endpoint 104, such as when the muting is performed by the server 110 or by sending a signal to the particular endpoint 104 to unmute and, in response, the particular endpoint unmutes. Automatic unmute may only be available under certain circumstances, or may not be permitted depending on the privacy laws imposed by the countries in which the conference server is used.

The determination that the muting is in error performed by the test 508 is variously embodied. In one embodiment, a preceding portion of the conference content, such as provided by a different endpoint 104 addressed the participant 102 associated with the particular endpoint 104, such as by name, role, location, etc. In another embodiment, the analysis of a video portion of the muted participant 102 indicates the muted participant is attempting to speak to the video conference. For example, the analysis of the video portion may indicate the muted participant's gaze is directed to the associated endpoint 104, and the participant's lips/mouth/other facial features are moving indicating speech, which will be discussed more completely with respect to FIGS. 8A-8B.

In one embodiment, upon detection by the conference server based on the video analysis of the person, that the muted participant is attempting to speak and contribute audio content to the video conference, an additional step may be performed by the server by signaling the endpoint to transmit the audio content to the server so the server's audio analysis and processing module may analyze the audio for voice characteristics to make a determination that the contributed audio actually contains human voice possessing certain magnitude of various speech characteristics (e.g., intensity, pitch, range, tone, language, etc.) which indicates that the user is actually contributing content to the conference.

Figure 6A:
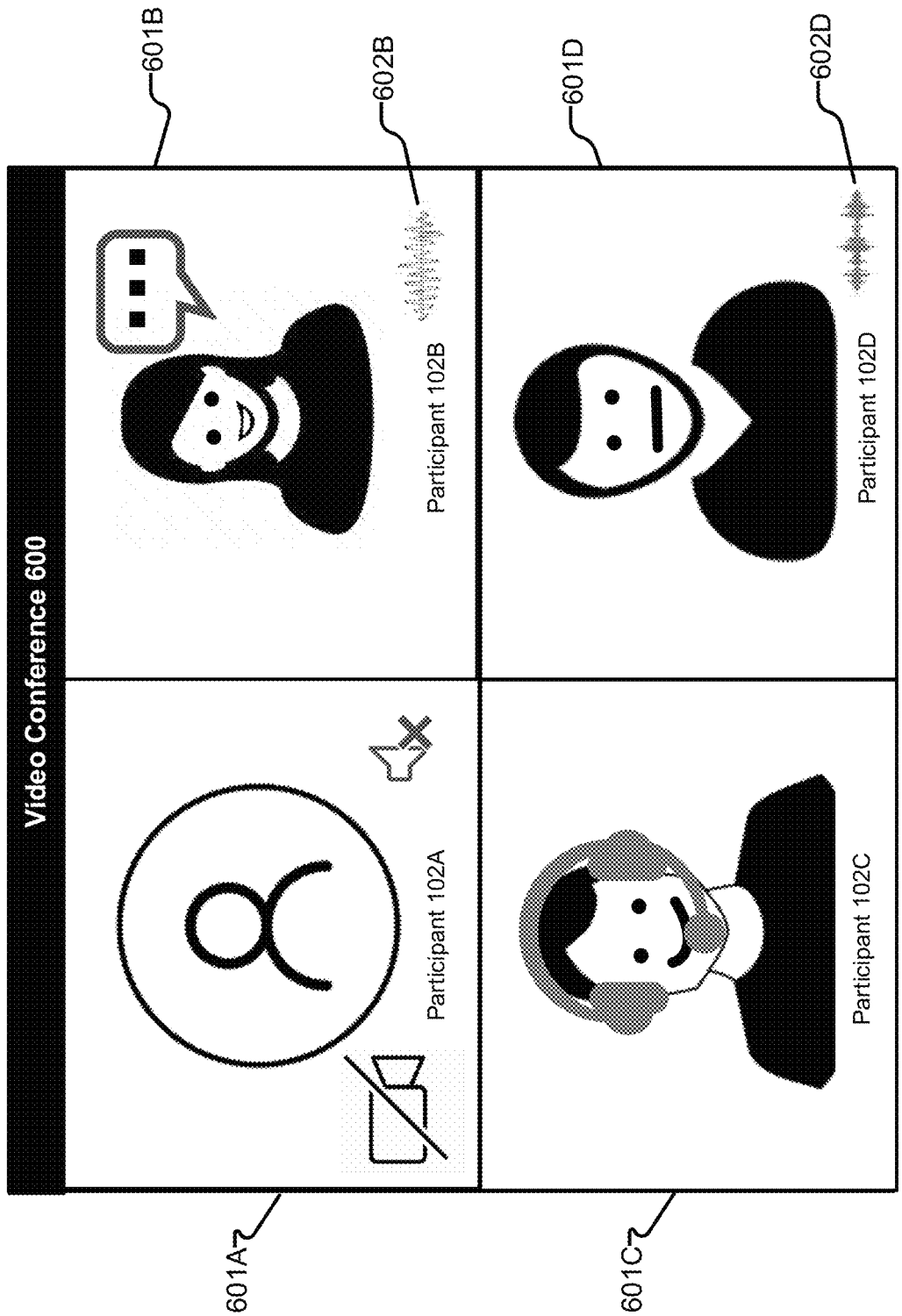
FIGS. 6A-6B depict a third interaction in accordance with embodiments of the present disclosure.
Figure 6B:
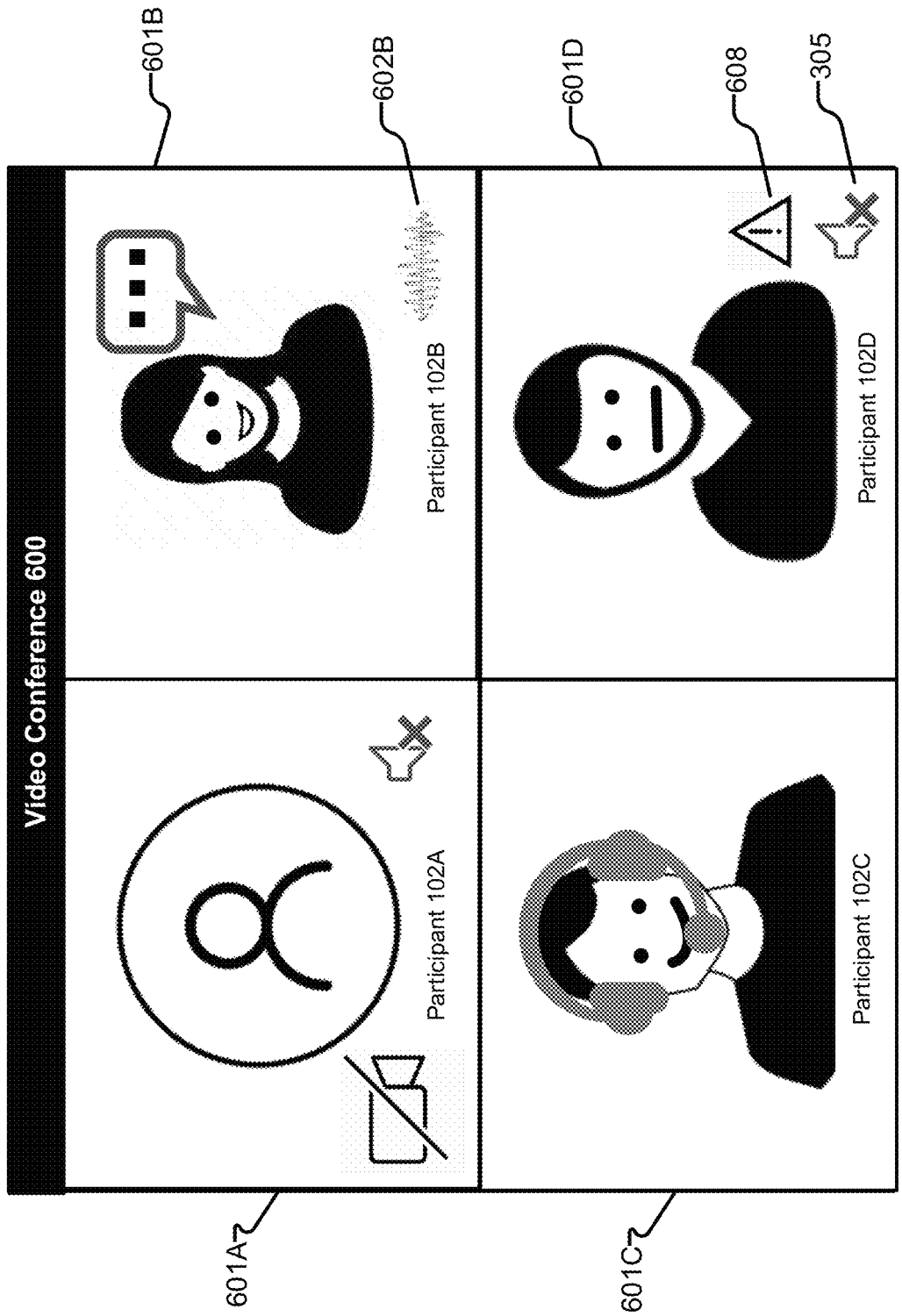

FIGS. 6A-6B depict a video conference 600. The video conference 600 includes participants 102A-D shown in conference windows 601A-D, respectively. The participants 102A-D are connected to the video conference 600 via respective endpoints 104A-D. The participant 102A as illustrated is not sharing video or audio. The participant 102B is sharing audio (e.g., as shown by an audio/noise indicator 602B) and video, and is currently the active speaker in the video conference 600. The participant 102C is sharing video and audio (e.g., unmuted), but in not currently speaking/contributing audio. The participant 102D is sharing video and audio (e.g., unmuted), although the participant 102D is not currently speaking, there is audio being contributed to the conference content, as illustrated by an audio/noise indicator 602D.

The conference content comprises audio and video received from one or more individual endpoints (e.g., the endpoints 104A-D) associated with the participants 102A-D. In this example, the audio portion of the conference content includes speech contributed by the participant 102B and audio that is not speech contributed by the participant 102D. The server 110 determines if the audio received by a particular endpoint 104 is extraneous to the video conference. In this example, the speech contributed by the participant 102B is determined to be part of and intended for the video conference 600. In contrast, the audio portion from the participant 102D is determined to be noise other than speech (e.g., environmental noise, background noise, incomprehensible speech, etc.). In some embodiments, the video conference system may perform an analysis of the video portion contributed by the participant 102D, in analyzing the video portion of the participant 102D, the video conferencing system determines that although the endpoint 104D is contributing audio, and the gaze of the participant 102D is directed to the endpoint 104D, the mouth/lip/other facial features of participant 102D are not moving. In some embodiments, the video conference server may use one or more AI Vision libraries or third party services hosted in cloud already trained with numerous samples of the human facial structure and facial characteristics in order to recognize different parts of any newly provided facial images and to identify the movements of different facial parts in that image. An artificial neural network may also be used to achieve this.

The audio portion may be analyzed for voice characteristics (e.g. the intensity, volume, loudness, tone, pitch, range, language, etc.). For example, the range of human voice is 50-70 decibels, whereas the range of extraneous noises is generally higher around 80-100 decibels. Also, the other sound characteristics vary significantly between the human speech and other noises. The language spoken may also be used to determine context (e.g., if the speech is meant for the video conference) since the user may also be speaking to someone outside the conference, for example, speaking with someone over another phone call in a language other than the language of the conference. Additionally or alternatively, and the video conference system may use NLP to analyze the audio portion from the participant 102D/the endpoint 104D to determine the audio portion from the participant 102D/the endpoint 104D does not comprise speech (e.g., street noise, barking dog, etc.) or does not comprise speech not directed to the conference, and determine the sound is to be excluded from the conference content and execute a muting action. Once the video conference system determines that the audio portion from the participant 102D/the endpoint 104D is extraneous, the video conference system may automatically mute the participant 102D/the endpoint 104D to exclude current and/or future audio received from the participant 102D/the endpoint 104D from being broadcast in the conference content. Muting may be performed by a processor of a server, such as server 110 providing the conference content, or by a signal to the endpoint 104D that, when received, performs the muting action.

As illustrated in FIG. 6B, the participant 102D has been muted (e.g., as indicated by a mute icon 305). In addition, the participant 102D may receive a notification 608 of the muting action. The notification 608 may comprise a tone, message, pop-up message, etc. The notification 608 may be provided to the participant before or after the auto mute action (e.g., "You are being muted by the system" or "You have been muted by the system"). In some embodiments, a visual indicator may be provided on an endpoint (e.g., the endpoint 104D) in the conference application.

Figure 7A:
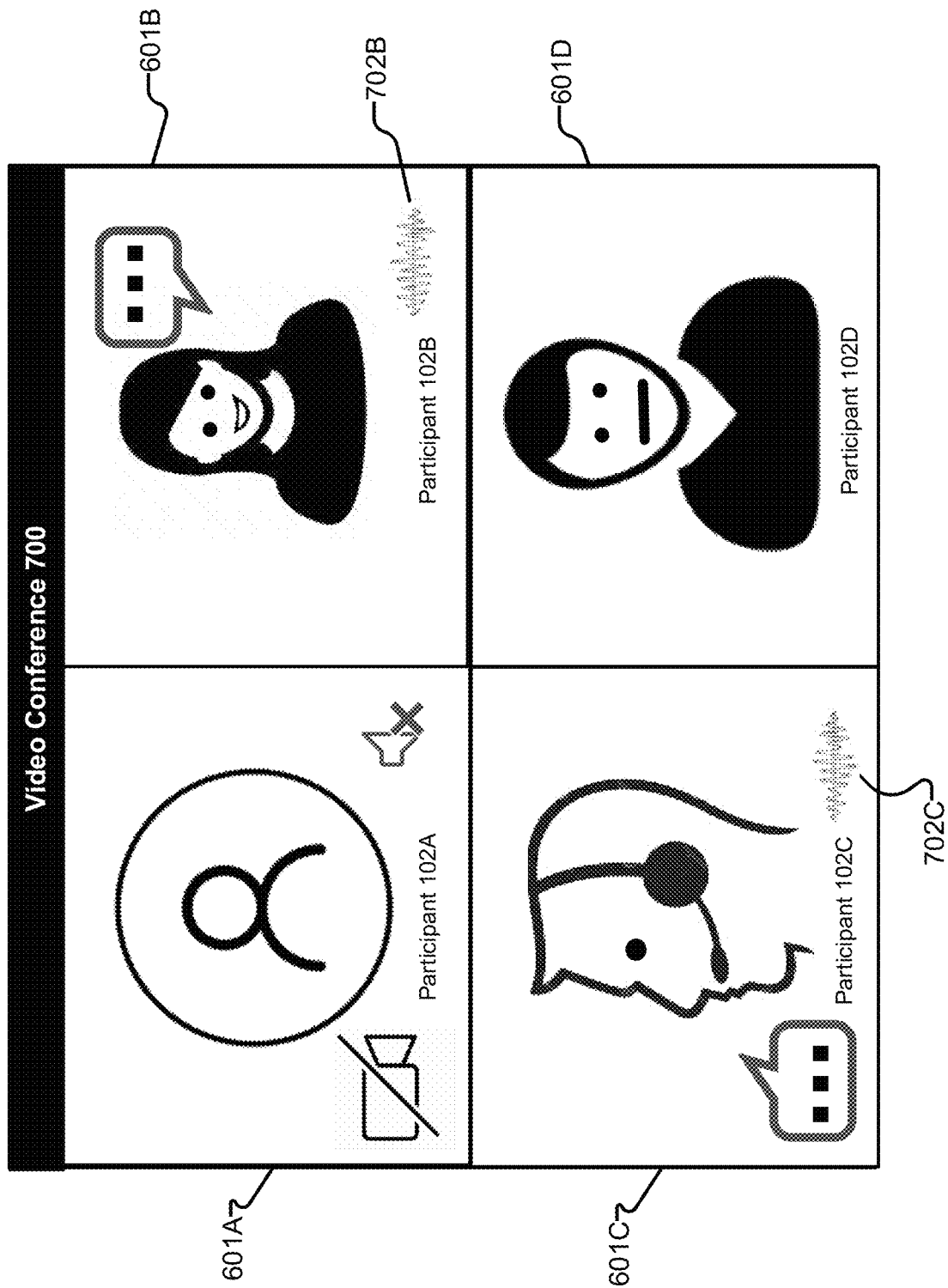
FIGS. 7A-7B depict a fourth interaction in accordance with embodiments of the present disclosure.
Figure 7B:
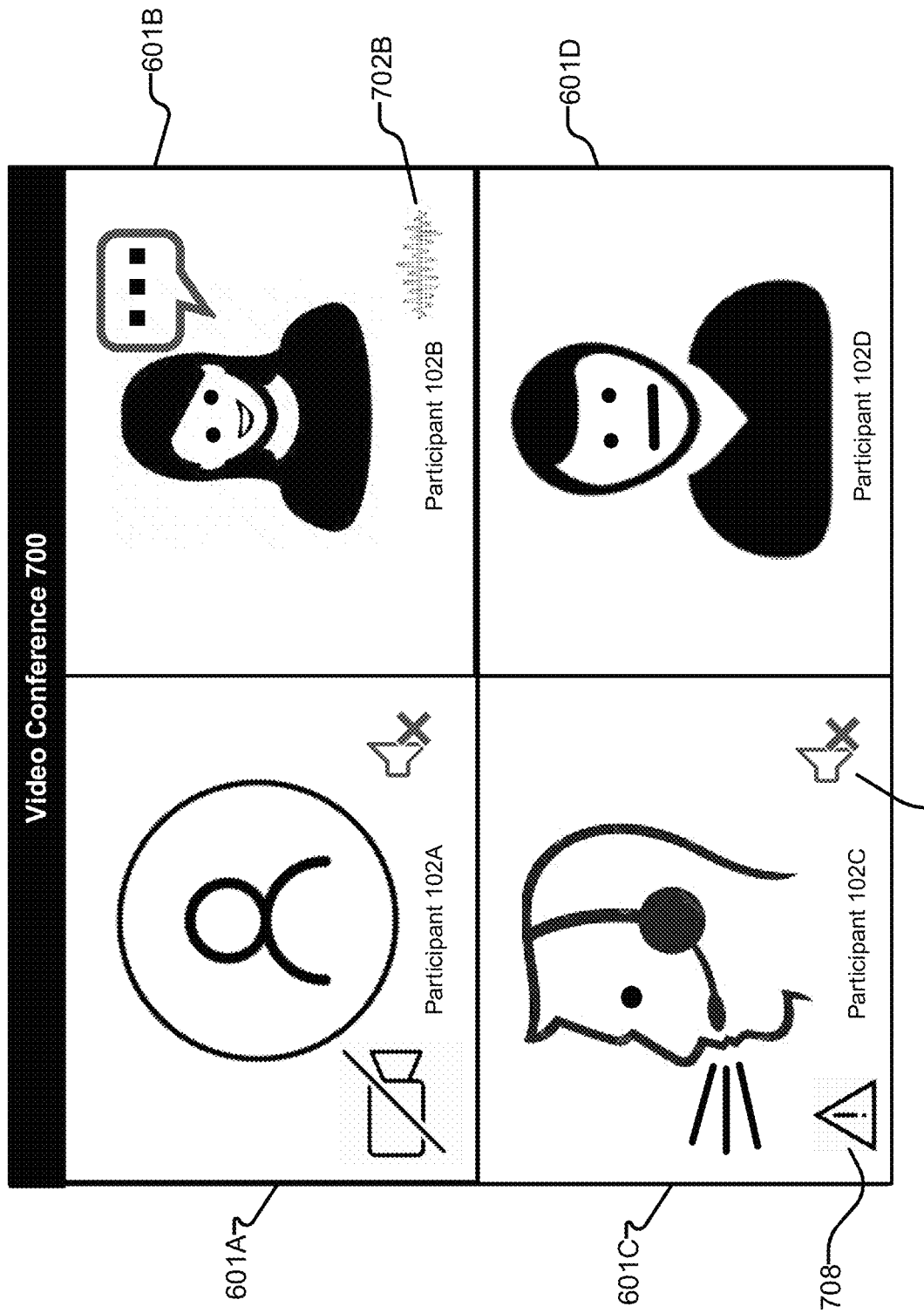

FIGS. 7A-7B depict a video conference 700. The video conference 700 includes participants 102A-D shown in conference windows 601A-D, respectively. The participants 102A-D are connected to the video conference 700 via respective endpoints 104A-D. The participant 102A as illustrated is not sharing video or audio. The participant 102B is sharing audio (e.g., as illustrated by an audio/noise indicator 702B) and video, and is currently the active speaker in the video conference 700. The participant 102C is sharing video and audio (e.g., as indicated by an audio/noise indicator 702C), and is currently speaking. The participant 102D is sharing video and is unmuted, but not speaking.

The conference content comprises audio from the participants 102B and 102C and video from the participants 102B-D. In this example, the audio portion of the conference content includes speech contributed by the participants 102B and 102C. The server 110 determines if the audio received by a particular endpoint 104 is extraneous to the video conference. In this example, the speech contributed by the participant 102B is determined to be part of and intended for the video conference 700. In contrast, the audio portion from the participant 102C is determined to be extraneous noise not directed to the video conference 700. In some embodiments, the video conference system may perform an analysis of the video portion contributed by the participant 102C, in analyzing the video portion of the participant 102C, the video conferencing system determines that although the endpoint 104C is contributing audio (e.g., speech), the gaze of the participant 102C is not directed to the endpoint 104C. The participant 102C is turned away from endpoint 104C, and shown in profile. The determination that the participant 102C is speaking and/or the audio from the participant 102C comprises speech may be accomplished by analyzing the video portion from the participant 102C and/or using voice characteristic analysis and/or NLP to analyze the audio portion from the endpoint 104C. For example, one speaking to a group of remote video conference participants may have a particular manner of speaking that differs when speaking to a colleague or other party face-to-face. These manners may be quantified as various speech attributes and, utilized to determine whether speech provided by the participant is or is not intended for inclusion into the conference content. The context of the audio portion may also be determined and used to determine whether the speech is intended for inclusion into the conference content. For example, a participant discussing their after-work plans may not be intended for the video conference 700.

Once the video conference system determines that the audio portion from the endpoint 104C is extraneous, the video conference system may automatically mute the endpoint 104C to exclude current and/or future audio received from the endpoint 104C from being broadcast in the conference content. As depicted in FIG. 7B, the participant 102C is automatically muted by the video conference system (e.g., as shown by a mute icon 305). Muting may be performed by a processor of a server, such as server 110 providing the conference content, or by a signal to the endpoint 104C that, when received, performs the muting action. Although not required, in some embodiments the participant 102C may receive a notification 708 of the muting action before or after the muting action is performed. In some embodiments, a message may be provided to the endpoint 104C to notify the participant 102C to perform a manual mute.

Figure 8A:
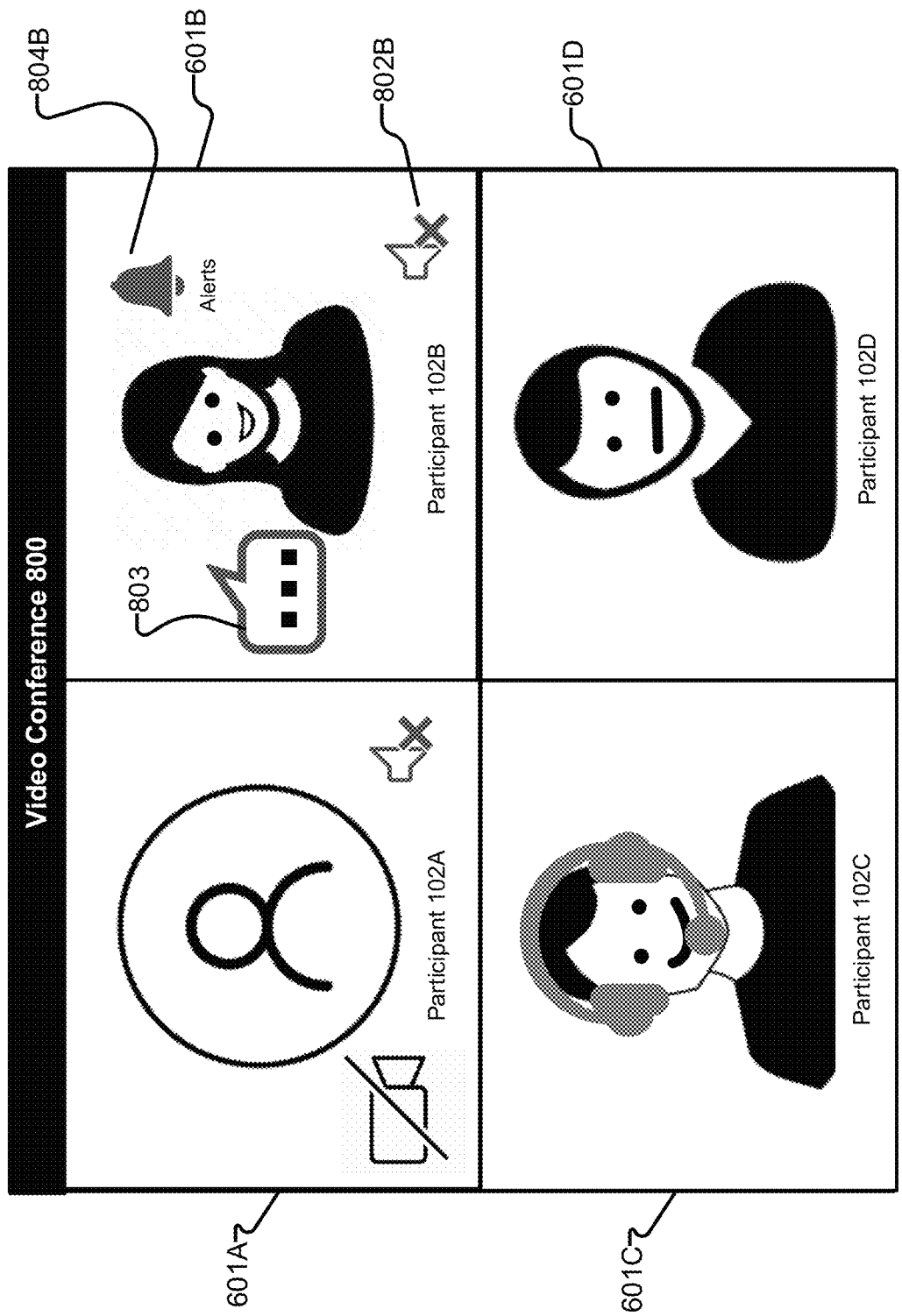
FIGS. 8A-8B depict a fifth interaction in accordance with embodiments of the present disclosure.
Figure 8B:
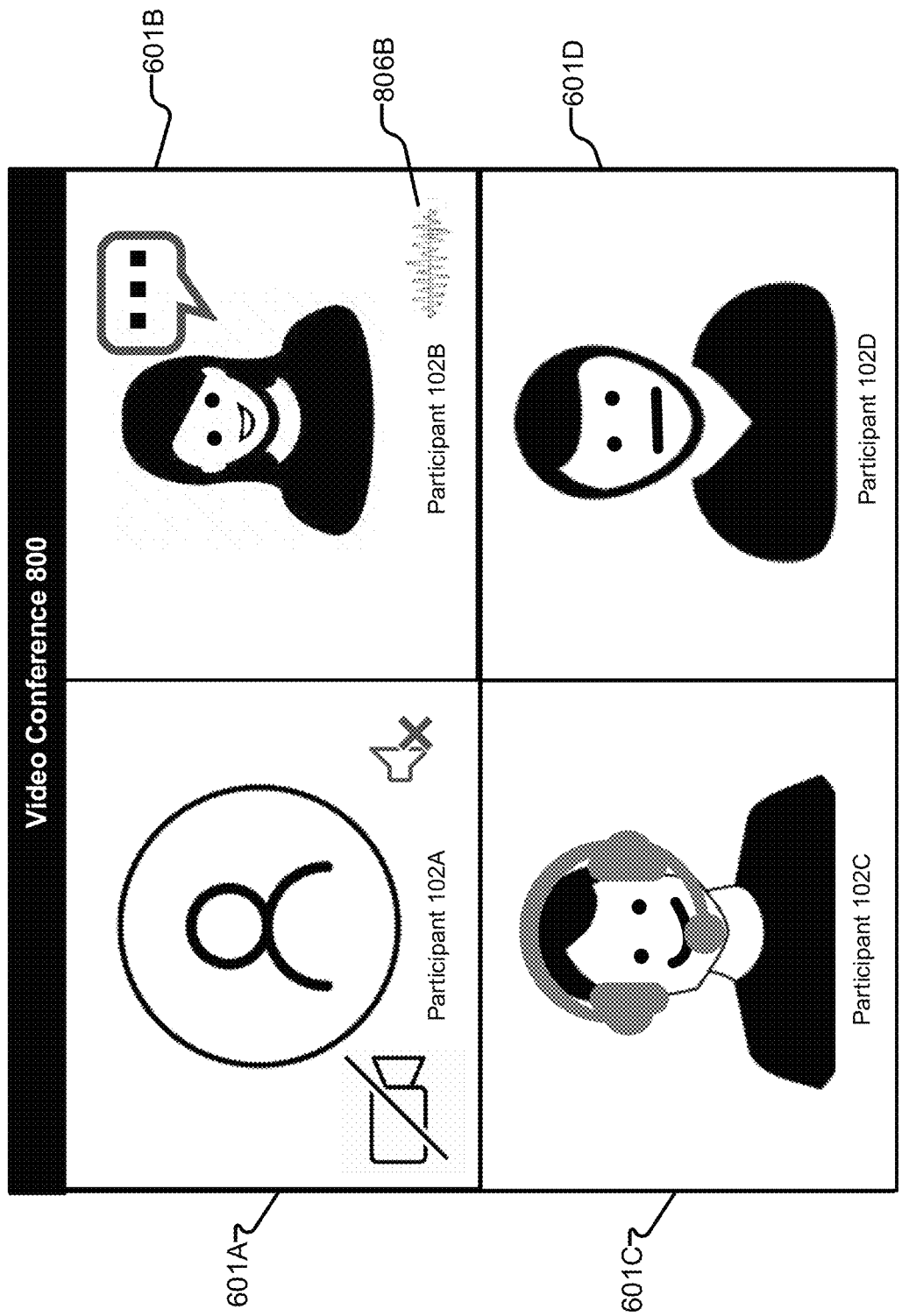

FIGS. 8A-8B depict a video conference 800. The video conference 800 includes participants 102A-D shown in conference windows 601A-D, respectively. The participants 102A-D are connected to the video conference 800 via respective endpoints 104A-D. The participant 102A as illustrated is not sharing video or audio. The participant 102B is muted (e.g., as indicated by a mute icon 802B), but sharing video. The participants 102C and 102D are both unmuted and sharing video. As illustrated by a speech bubble 803, the participant 102B may be attempting to speak while on mute. If video conference system determines that a participant (e.g., the participant 102B) may be erroneously muted, video conference system notifies the erroneously muted participant to unmute. In some embodiments, if permitted, the system will automatically mute/unmute an erroneously unmuted/muted participant. Additionally, or alternatively, the system may buffer a muted audio portion for replay after a participant is unmuted.

The conference content comprises audio from the participants 102C and 102D and video from the participants 102B-D. As neither the participant 102C nor the participant 102D is speaking, the audio portion may only comprise silence. The video conference system determines if a particular participant 102/endpoint 104 is trying to transmit audio while the particular endpoint 104 is on mute. In some embodiments, the server 110 receives the audio portion but does not transmit the audio portion of participants on mute. In other embodiments, when a participant is muted, the video conference system does not receive audio for the associated endpoint 104. For example, video conference system may detect a muting signal by the endpoint 104B. In another embodiment, muting may be provided by the endpoint 104B itself wherein video conference system receives a signal indicating that audio is being received by the endpoint 104B but not forwarded to the video conference system due to the endpoint 104B being on mute.

Video conferencing system determines whether the muting on the endpoint 104B is in error. In some embodiments, analysis of the video and/or audio portion contributed from the endpoint 104C may result in the determination that the participant 102B is attempting to speak to the video conference 800. For example, based on analysis of the video portion contributed from the endpoint 102B, video conferencing system may determine that the gaze of the participant 102B is directed at the endpoint 104B, and that the mouth/lips/other facial features of the participant 102B are moving. Additionally or alternatively, NLP may be used to determine a question requiring a spoken response was directed to the participant 102B. The video conferencing system sends an alert 804B (e.g., a tone, message, pop-up visual indicator, etc.) to the participant 102B/the endpoint 104B to unmute the erroneously muted participant 102B/the endpoint 104B. If permitted, video conferencing system may automatically unmute the erroneously muted participant 102B/endpoint 104B, and the audio is received from the endpoint 104B, such as when the muting is performed by the video conferencing system or by sending a signal to the endpoint 104B to unmute and, in response, the endpoint 104B unmutes. A notification in the form of message may be provided to the participant before or after the unmute action is performed (e.g. "You are being unmuted by the system" or "You have been unmuted by the system."). Automatic unmute may only be available under certain circumstances based on legal and ethical considerations. FIG. 8B depicts the video conference 800 after the participant 102B has been unmuted (e.g., either automatically or manually). The participant 102B may now be able to contribute audio to the video conference 800, as illustrated by an audio/noise indicator 806B.

The conference server may also use a confidence level or threshold in making the determinations about whether a participant is erroneously muted or unmuted. In order to achieve multiple levels of confidence the system can make use of NLP, video analysis, and audio analysis. When the conclusion from the NLP, video, and audio analysis all match, the confidence level may be high; when any two match, the confidence level may be medium; and if none of the three match, or only one can be determined, the confidence level may be low.

Figure 9A:
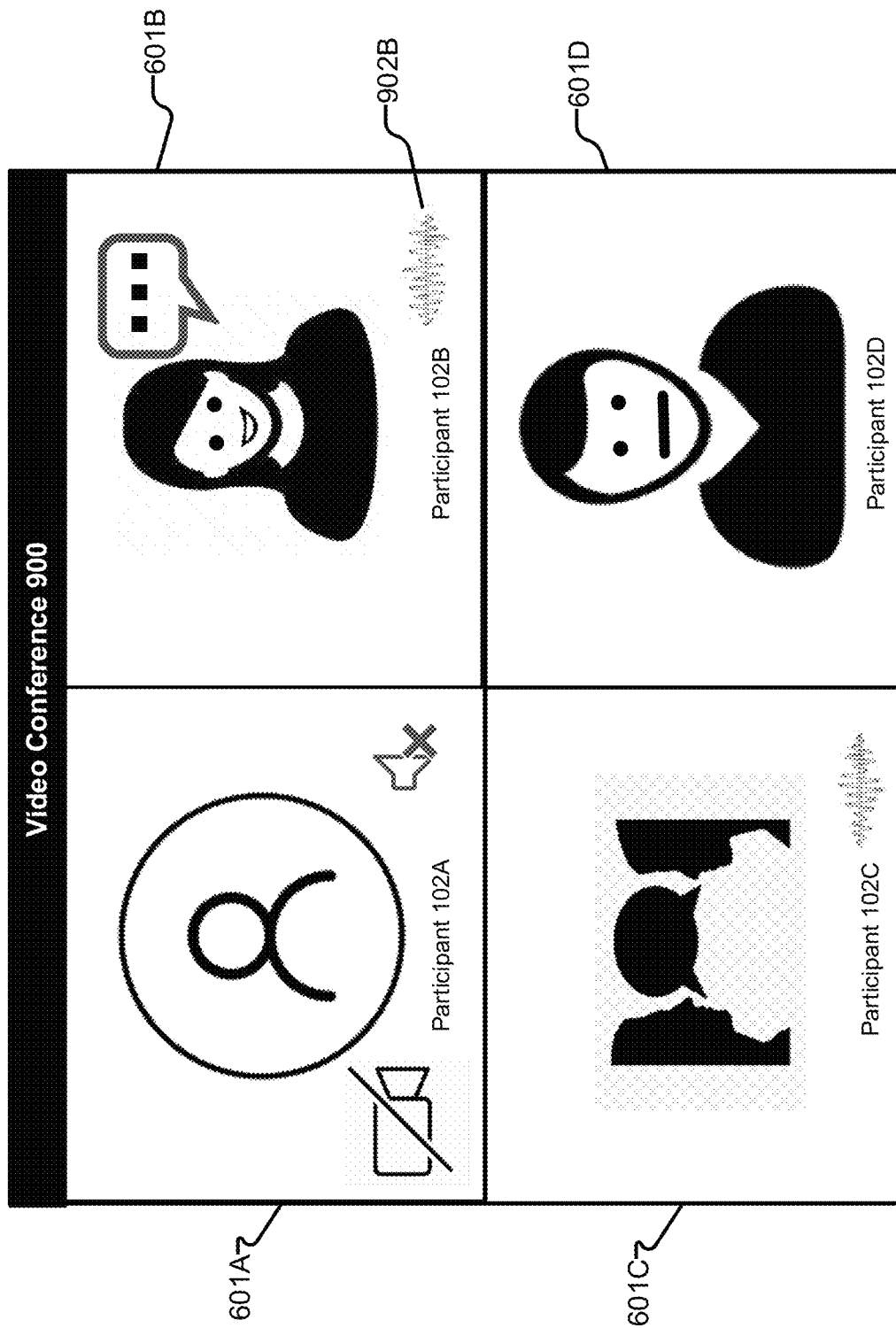
FIGS. 9A-9C depict a sixth interaction in accordance with embodiments of the present disclosure.
Figure 9B:
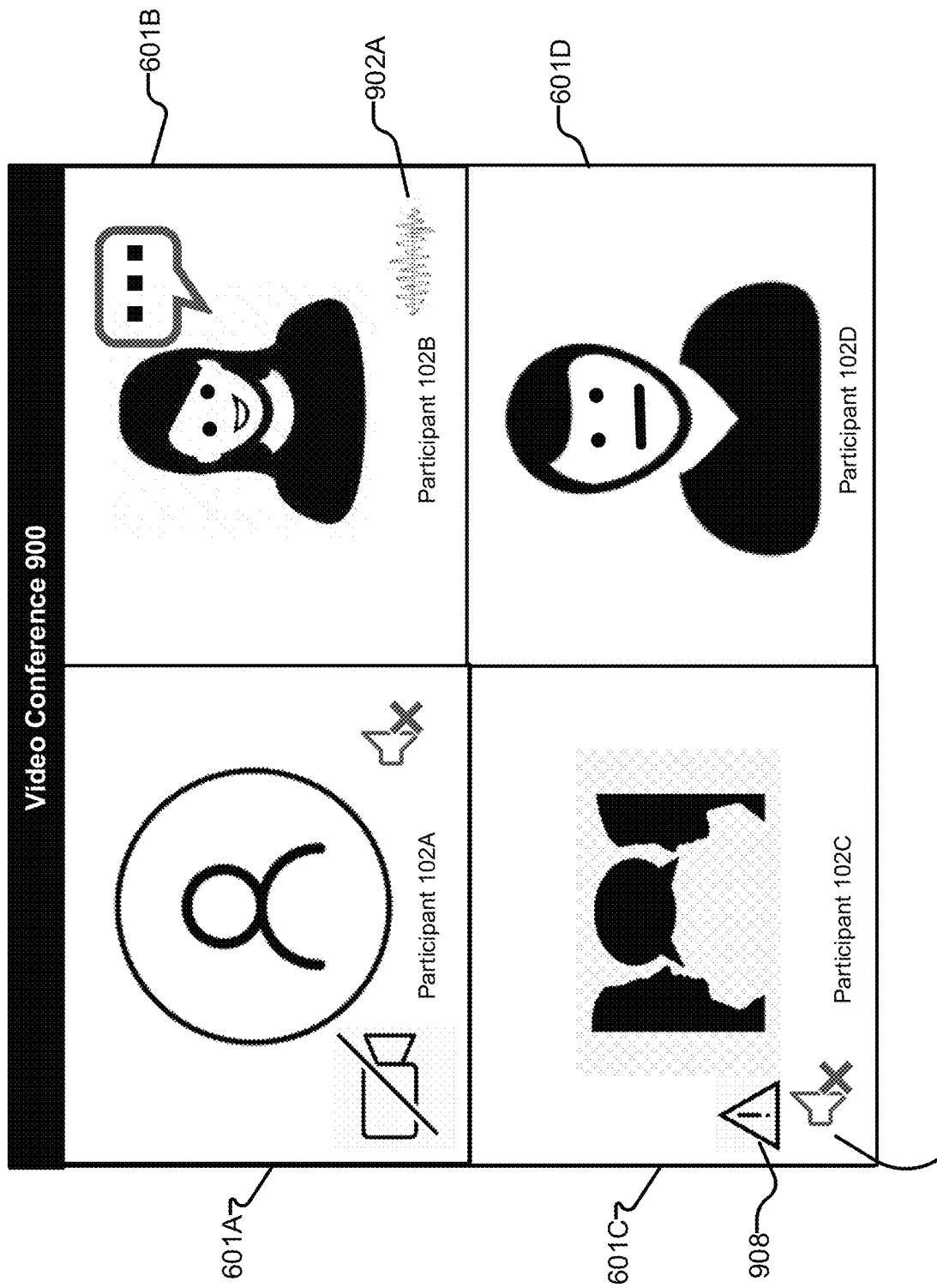
Figure 9C:
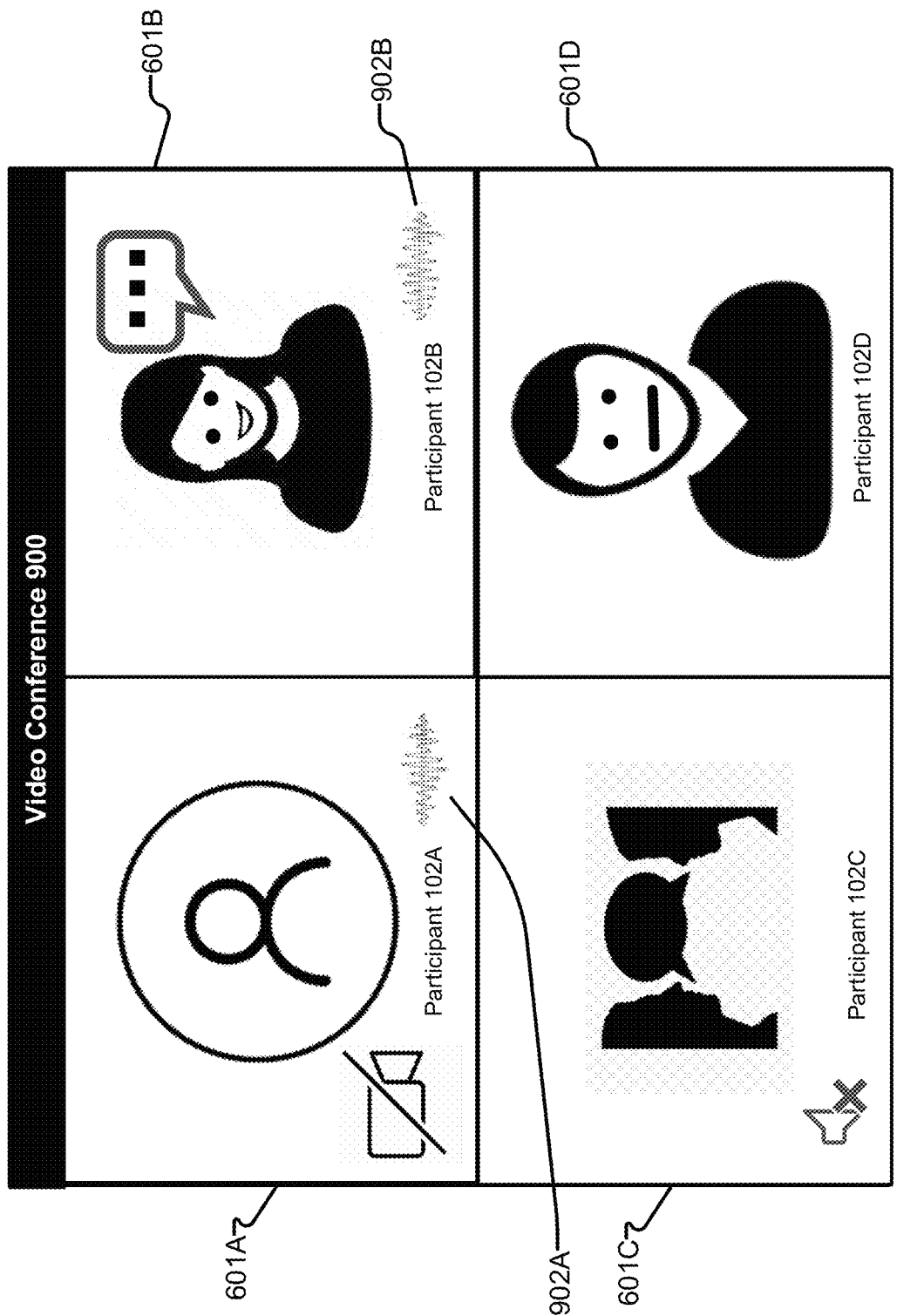

FIGS. 9A-9C depict a video conference 900. The video conference 900 includes participants 102A-D shown in conference windows 601A-D, respectively. The participants 102A-D are connected to the video conference 900 via respective endpoints 104A-D. The participant 102A as illustrated is not sharing video or audio. The participant 102B is sharing audio (e.g., as indicated by an audio/noise indicator 902B) and video, and is currently the active speaker in the video conference 900. The participant 102C is sharing video and audio (e.g., as shown by an audio/noise indicator 902C), and is currently speaking. The participant 102D is sharing video and is unmuted, but not speaking.

The conference content comprises audio from the participants 102B and 102C and video from the participants 102B-D. In this example, the audio portion of the conference content includes speech contributed by the participants 102B and 102C. The video conferencing system determines if the audio received by a particular endpoint 104 is extraneous to the video conference. In this example, the speech contributed by the participant 102B is determined to be part of and intended for the video conference 900. In contrast, the audio portion from the participant 102C is determined to be extraneous noise not directed to the video conference 900. In some embodiments, the video conference system may perform an analysis of the video portion contributed by the participant 102C and, in analyzing the video portion of the participant 102C, the video conferencing system may determine that although the participant 102C/the endpoint 104C is contributing audio (e.g., speech), the gaze of the participant 102C is not directed to the endpoint 104C. In this example, the analysis of the video may further indicate that there is another person in the video with the participant 102C. The determination that the participant 102C is speaking with someone else and not to the video conference 900 may additionally or alternatively be accomplished by using NLP to analyze the audio portion from the endpoint 104C to determine the context of the speech. When the NLP and video analysis are taken together, the determination that the participant 102C is not speaking to the video conference 900 may have a higher confidence score. Additionally, audio analysis of the incoming audio portion may be performed to analyze parameters of speech based on intensity, pitch, range, tone, language, etc. In some examples, when the participant is speaking with someone else, they might be shouting or whispering, which may change the pitch and intensity of the audio more than the normal pitch and intensity.

Once the video conference system determines that the audio portion from the endpoint 104C is extraneous, the video conference system automatically mutes the endpoint 104C to exclude current and/or future audio received from the endpoint 104C from being broadcast in the conference content. As depicted in FIG. 9B, the endpoint 104C is automatically muted by the video conference system (e.g., as indicated by a mute icon 305). Muting may be performed by a processor of a server, such as the server 110 providing the conference content, or by a signal to the endpoint 104C that, when received, performs the muting action. The participant 102C may receive a notification 908 of the muting action before or after the muting action is performed.

As illustrated in FIG. 9C, although the participant 102A is not sharing video as indicated by the icon  the participant 102A is sharing audio as indicated by an audio/noise indicator 902A. Since there is no video portion associated with the participant 102A, only the audio portion may be analyzed to determine if the audio portion extraneous to the video conference 900. Audio analysis of the incoming audio portion from the participant 102A may be performed to analyze parameters of speech based on intensity, pitch, range, tone, language, etc.

Figure 10:
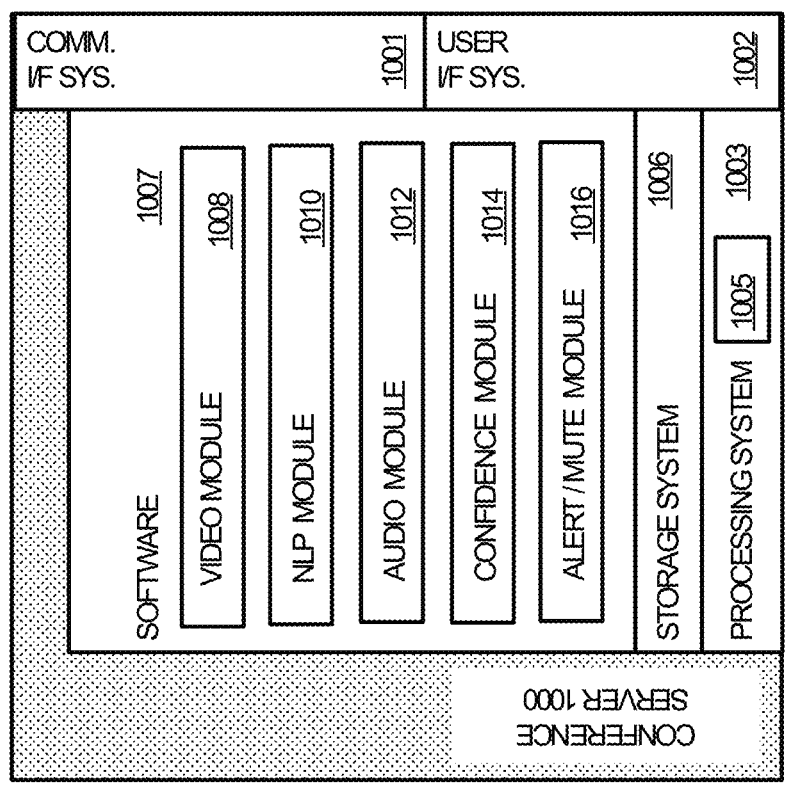
FIG. 10 depicts a video conference server in accordance with embodiments of the present disclosure.

FIG. 10 depicts a video conference server 1000 in accordance with embodiments of the present disclosure. The video conference server 1000 intelligently mutes/unmutes the audio portion of a participant in a video conference. Similar computing systems may be included in the server 110, in whole or in part, described herein used automatically mute a participant/prompt a participant to mute and/or automatically unmute a participant/prompt a participant to unmute. A computing system 1000 is representative of any computing system or systems with which the various operational architectures, processes, scenarios, and sequences disclosed herein for analyzing at least the video portion of a video conference to determine whether a participant should be muted/unmuted, comprising various components and connections to other components and/or systems. Additionally, the audio portion maybe be analyzed to further strengthen the determination.

The computing system 1000 is an example of the server 110, although other examples may exist. The computing system 1000 comprises a communication interface 1001, a user interface module 1002, and a processing system 1003. The processing system 1003 is linked to the communication interface 1001 and user interface module 1002. Processing system 1003 includes a microprocessor and/or processing circuitry 1005 and storage system 1006 that stores operating software 1007. Computing system 1000 may include other well-known components such as a battery and enclosure that are not shown for clarity. Computing system 1000 may comprise a server, a user device, a desktop computer, a laptop computer, a tablet computing device, or some other user communication apparatus.

Communication interface 1001 comprises components that communicate over communication links, such as network cards, ports, radio frequency (RF), processing circuitry and software, or some other communication devices. Communication interface 1001 may be configured to communicate over metallic, wireless, or optical links. Communication interface 1001 may be configured to use Time Division Multiplex (TDM), Internet Protocol (IP), Ethernet, optical networking, wireless protocols, communication signaling, or some other communication format—including combinations thereof. In some implementations, communication interface 1001 is configured to communicate with other end user devices, wherein the communication interface 1001 is used to transfer and receive voice and video communications for the devices. Further, communication interface 1001 may interface with a webservice, wherein the service may comprise a video conferencing service that can be accessed via a website.

User interface module 1002 comprises components that interact with a user to present media and/information, receive events coming from a participant endpoint application, and also allow a user (e.g., administrator) to configure settings of the video conference server. User interface module 1002 may include a speaker, microphone, buttons, lights, display screen, touch screen, touch pad, scroll wheel, communication port, or some other user input/output apparatus—including combinations thereof. User interface module 1002 may be omitted in some examples.

Processing circuitry 1005 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via a bus, executes instructions, and outputs data, again such as via the bus. In other embodiments, processing circuitry 1005 may comprise a shared processing device that may be utilized by other processes and/or process owners, such as in a processing array or distributed processing system (e.g., "cloud", farm, etc.). It should be appreciated that processing circuitry 1005 is a non-transitory computing device (e.g., electronic machine comprising circuitry and connections to communicate with other components and devices). Processing circuitry 1005 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor (e.g., processor 704) and the hardware and other circuitry thereof.

Processing circuitry 1005 comprises a microprocessor and other circuitry that retrieves and executes operating software 1007 from storage system 1006. Storage system 1006 may include volatile and nonvolatile, removable and non-removable media implemented in any method or technology for storage of information, such as computer readable instructions, data structures, program modules, or other data. Storage system 1006 may be implemented as a single storage device, but may also be implemented across multiple storage devices or sub-systems. Storage system 1006 may comprise additional elements, such as a controller to read operating software 1007. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 1005 is typically mounted on a circuit board that may also hold storage system 1006 and portions of the communication interface 1001 and the user interface module 1002. The operating software 1007 comprises computer programs, firmware, or some other form of machine-readable program instructions. The operating software 1007 includes a video module 1008, a Natural Language Processing (NLP) module 1010, an audio module 1012, and a confidence module 1014, although any number of software modules within the application may provide the same operation. The operating software 1007 may further include an operating system, utilities, drivers, network interfaces, applications, or some other type of software. When executed by the processing circuitry 1005, the operating software 1007 directs the processing system 1003 to operate the video conference server 1000 as described herein.

In at least one implementation, the video module 1008, when read and executed by the processing system 1003, directs the processing system 1003 to process at least a video portion of a video conference to intelligently determine whether a participant should be muted or unmuted. In some examples, the video module comprises AI Driven Facial Movement Recognition and Analysis module #1. The NLP module 1010 when read and executed by the processing system 1003, directs the processing system 1003 to analyze the conversion (e.g., audio portion) in real time to determine context. In some examples, the NPL module 1010 may comprise a language module. The audio module 1012, when read and executed by the processing system 1003, directs the processing system 1003 to analyze the audio portion of a video conference for speech/audio characteristics (e.g., volume, intensity, range, tone, pitch, language, etc.) context, etc. The confidence module 1014, when read and executed by the processing system 1003, directs the processing system 1003 to determine a confidence score for a muting/unmuting action. The confidence module 1014 interfaces with the video module 1008, and the NLP module 1010, and the audio module 1012, in order to determine a confidence level for an unmuting/muting action. The alert/muting module 1016 when read and executed by the processing system 1003, directs the processing system 1003 to automatically mute/unmute (as permitted) endpoints, and send alerts/notifications regarding the mute/unmute actions.

It should be appreciated that computer readable data may be sent, received, stored, processed, and presented by a variety of components. It should also be appreciated that components illustrated may control other components, whether illustrated herein or otherwise. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally, or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm." Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion coprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARIV1926EJ-S™ microprocessors, other industry-equivalent microprocessors, and may perform computational functions using any known or future-developed standard, instruction set, libraries, and/or architecture. Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, sub combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A video conference server, comprising:
    a network interface to a network;
    a storage component comprising a non-transitory storage device;
    a processor, comprising at least one microprocessor; and
    wherein the processor, upon accessing machine-executable instructions, is caused to:
        broadcast conference content, via the network, to each of a plurality of endpoints, wherein the broadcasted conference content comprises an audio portion and a video portion received from each of the plurality of endpoints;
        process at least the video portion from at least one endpoint to determine whether a corresponding audio portion is extraneous to the broadcasted conference content and determine a confidence score associated with the determination whether the corresponding audio portion is extraneous to the broadcasted conference content, wherein the confidence score is based on analysis of the video portion and at least one of natural language processing and/or analysis of the audio portion; and
        upon determining that the corresponding audio portion is extraneous to the broadcasted conference content, execute a muting action to exclude the corresponding audio portion from the broadcasted conference content.

2. The video conference server of claim 1, wherein additional instructions, when executed further cause the processor to:
    automatically mute an endpoint associated with the corresponding audio portion; and
    transmit a message to the automatically muted endpoint indicating that the endpoint was automatically muted.

3. The video conference server of claim 1, wherein additional instructions, when executed further cause the processor to:
    signal an endpoint associated with the corresponding audio portion to cause the associated endpoint to prompt a participant to mute their audio.

4. The video conference server of claim 1, wherein additional instructions, when executed further cause the processor to:
    automatically mute an endpoint associated with the corresponding audio portion when the confidence score is above a threshold.

5. The video conference server of claim 1, wherein additional instructions, when executed further cause the processor to:
    determine that a participant in the at least the video portion is speaking but not looking at their screen.

6. The video conference server of claim 1, wherein additional instructions, when executed further cause the processor to:
    determine that a participant in the at least the video portion is not speaking and/or the corresponding audio portion does not comprise speech.

7. The video conference server of claim 1, wherein additional instructions, when executed further cause the processor to:
    determine that there is no person in the at least the video portion.

8. The video conference server of claim 1, wherein additional instructions, when executed further cause the processor to:
    determine at least one of: a participant's lips are not moving, the participant's other facial parts do not indicate speech, and/or the participant's facial expressions do not indicate speech.

9. The video conference server of claim 1, wherein additional instructions, when executed further cause the processor to:
    process the at least the video portion from the at least one endpoint to determine whether the at least one endpoint is unintentionally muted; and
    upon determining that the at least one endpoint may be unintentionally muted, execute signaling to the at least one endpoint that may be unintentionally muted to cause the at least one endpoint to prompt participant associated with the at least one endpoint to unmute their audio.

10. The video conference server of claim 9, wherein additional instructions, when executed further cause the processor to:
    determine that the participant associated with the at least one endpoint is looking at a camera and/or screen, and at least one of: the participant's lips are moving, the participant's other facial parts indicate speech, and/or the participant's facial expressions indicate speech.

11. The video conference server of claim 9, wherein additional instructions, when executed further cause the processor to:

process at least the audio portion from at least one endpoint to determine a name associated with a particular conference participant was spoken; and upon determining that the name associated with the particular conference participant was spoken, transmitting to an endpoint associated with the particular conference participant a prompt to unmute their audio.

12. The video conference server of claim 9, wherein the prompt comprises at least one of: a textual, visual, and/or audible alert.

13. A method of muting an endpoint in a video conference, the method comprising:

broadcasting conference content to each of a plurality of endpoints, wherein the broadcasted conference content comprises an audio portion and a video portion received from each of the plurality of endpoints;

processing at least the video portion from at least one endpoint to determine whether a corresponding audio portion is extraneous to the broadcasted conference content and determine a confidence score associated with the determination whether the corresponding audio portion is extraneous to the broadcasted conference content, wherein the confidence score is based on analysis of the video portion and at least one of natural language processing and/or analysis of the audio portion; and upon determining that the corresponding audio portion is extraneous to the broadcasted conference content, executing a muting action to exclude the corresponding audio portion from the broadcasted conference content.

14. The method of claim 13, wherein executing the muting action to exclude the corresponding audio portion from the broadcasted conference content comprises sending a signal to an endpoint associated with the corresponding audio portion to cause the associated endpoint to prompt a participant to mute their audio.

15. The method of claim 13, wherein executing the muting action to exclude the corresponding audio portion from the broadcasted conference content comprises automatically muting an endpoint associated with the corresponding audio portion when the confidence score is above a threshold.

16. The method of claim 13, wherein processing the at least the video portion from the at least one endpoint comprises:

determining that a participant in the at least the video portion is speaking but their gaze is not direct to their device.

17. The method of claim 13, wherein processing the at least the video portion from the at least one endpoint comprises:

determining that a participant in the at least the video portion is not speaking and/or the corresponding audio portion does not comprise speech.

18. A method of unmuting an endpoint in a video conference, the method comprising:

broadcasting conference content to each of a plurality of endpoints, wherein the broadcasted conference content comprises an audio portion and a video portion received from each of the plurality of endpoints;

processing at least the video portion from at least one endpoint to determine whether the at least one endpoint is unintentionally muted and determine a confidence score associated with the determination whether the at least one endpoint is unintentionally muted, wherein the confidence score is based on analysis of the video portion from the at least one endpoint and at least one of natural language processing and/or analysis of the audio portion from the at least one endpoint; and upon determining that the at least one endpoint may be unintentionally muted, executing signaling to the unintentionally muted at least one endpoint to prompt a participant associated with the unintentionally muted at least one endpoint to unmute their audio.

19. The method of claim 18, wherein processing the at least the video portion from the at least one endpoint to determine whether the at least one endpoint may be unintentionally muted comprises:

determining that the at least one endpoint is muted, the participant associated with the at least one endpoint is looking at a camera and/or screen, and at least one of: the participant's lips are moving, the participant's other facial parts indicate speech, and/or the participant's facial expressions indicate speech.

20. The method of claim 18, wherein processing the at least the video portion from the at least one endpoint to determine whether the at least one endpoint may be unintentionally muted further comprises:

processing at least the audio portion from at least one endpoint to determine a name associated with a particular conference participant was spoken; and upon determining that the name associated with the particular conference participant was spoken, signaling an endpoint associated with the particular conference participant to prompt particular conference participant to unmute their audio.

* * * * *

UNITED STATES PATENT AND TRADEMARK OFFICE
CERTIFICATE OF CORRECTION

PATENT NO. : 11,082,465 B1
APPLICATION NO. : 16/998979
DATED : August 3, 2021
INVENTOR(S) : David Chavez et al.

Page 1 of 1

It is certified that error appears in the above-identified patent and that said Letters Patent is hereby corrected as shown below:

In the Claims

At Column 28, Line 54, after "endpoint to prompt" insert --a-- therein.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*